US012298900B2

(12) United States Patent
Ou et al.

(10) Patent No.: US 12,298,900 B2
(45) Date of Patent: May 13, 2025

(54) METHODS AND SYSTEMS FOR GARBAGE COLLECTION AND COMPACTION FOR KEY-VALUE ENGINES

(71) Applicants: Lemon Inc., Grand Cayman (KY); Beijing Volcano Engine Technology Co., Ltd., Beijing (CN)

(72) Inventors: Jiaxin Ou, Beijing (CN); Yi Wang, Beijing (CN); Jingwei Zhang, Beijing (CN); Zhengyu Yang, Los Angeles, CA (US)

(73) Assignee: Lemon Inc. (KY)

( * ) Notice: Subject to any disclaimer, the term of this patent is extended or adjusted under 35 U.S.C. 154(b) by 0 days.

(21) Appl. No.: 18/475,664

(22) Filed: Sep. 27, 2023

(65) Prior Publication Data

US 2024/0020231 A1    Jan. 18, 2024

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC ......... G06F 12/0253; G06F 2212/7205; G06F 12/0246
USPC ........................................ 707/692, 813, 817
See application file for complete search history.

(56) References Cited

U.S. PATENT DOCUMENTS

| | | | |
|---|---|---|---|
| 2012/0166498 A1* | 6/2012 | Gracie | G06F 12/0261 707/813 |
| 2013/0275976 A1* | 10/2013 | Dawson | G06F 9/5061 718/1 |
| 2015/0058568 A1 | 2/2015 | Fong et al. | |
| 2016/0357450 A1 | 12/2016 | Rao et al. | |
| 2017/0031959 A1 | 2/2017 | Zayas et al. | |
| 2021/0109855 A1* | 4/2021 | Watt | G06F 12/0253 |
| 2023/0325081 A1* | 10/2023 | Patel | G06F 3/0652 711/166 |
| 2024/0126689 A1* | 4/2024 | Ye | G06F 12/0253 |

OTHER PUBLICATIONS

Extended European Search Report for European Application No. 24198095.2, mailed Feb. 7, 2025, 7 pages.

* cited by examiner

*Primary Examiner* — Phong H Nguyen
(74) *Attorney, Agent, or Firm* — Fish & Richardson P.C.

(57) ABSTRACT

Methods and systems for garbage collection and compaction for key-value engines in a data storage and communication system. The method includes determining disk capacity usage of the key-value engine and adjusting a garbage collection percentage threshold and a number of garbage collection threads based on whether the disk capacity usage of the key-value engine meets and/or exceeds predetermined disk capacity usage thresholds. The method may further include performing a periodic compaction process to consolidate one or more expired pages of one or more applications on a log-structured merge (LSM) tree by merging one or more layers into a last layer of the one or more expired pages to reduce data handling during an occurrence of the garbage collection.

17 Claims, 11 Drawing Sheets

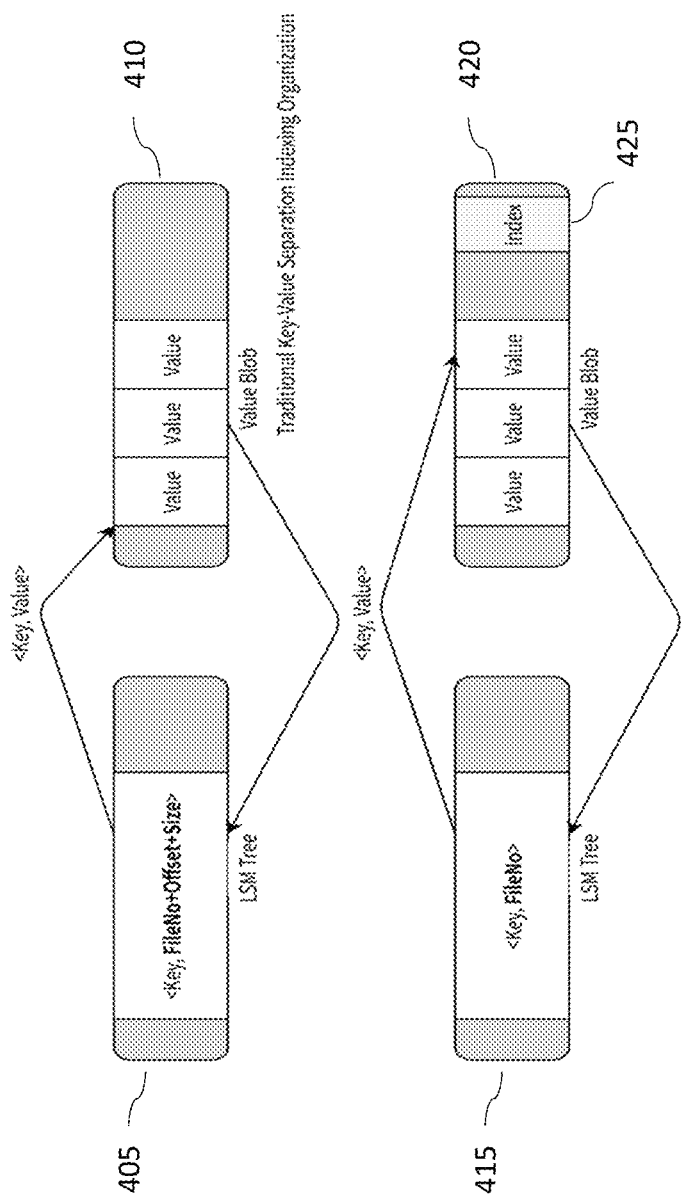

METHODS AND SYSTEMS FOR GARBAGE COLLECTION AND COMPACTION FOR KEY-VALUE ENGINES

FIELD

The embodiments described herein pertain generally to non-volatile storage systems in data storage and communication systems. More specifically, the embodiments described herein pertain to methods and systems for optimizing garbage collection and/or compaction for key-value engines in the data storage and communication systems.

BACKGROUND

Non-volatile storage, e.g., block-level storage, is a common form of storage that is used to store data on storage area networks, e.g., servers, in cloud-based storage environments, at a data center, in a server system, etc. Cloud-based storage or storage device is a common product offered by cloud service providers (CSPs). In some cloud-based storage or storage devices, key-value engines may be used to meet the persistence requirement of the cloud services. While key-value engines may be adopted as the storage backend for the cloud services, prior key-value engines may introduce overheads for ingesting data, such as, write-amplification factor (WAF) and tail latency.

SUMMARY

Methods and systems are described herein directed to optimizing garbage collection and/or compaction processes in key-value engine systems that overcome one or more of the above deficiencies of prior key-value engines. In some embodiments, the key-value engines, as described herein, are designed, programmed, or otherwise configured to provide one or more of the following features: awareness of application-side data deletion, including expired pages, e.g., communication and/or collaboration between the key-value engine and the file system; a flexible and diverse garbage collection process; a periodic compaction functionality; addressing read amplification issues; and/or identifying and segregating hot and cold data, e.g., including one or more of compaction, rewriting, garbage collection, and the like. As such, the key-value engines, as described herein, are configured to proactively reclaim storage space without obstructing foreground client threads, for example, by being both capacity-aware and capable of dynamically adjusting the level of parallelism of garbage collection threads, e.g., dynamically adjusting garbage collection threads and garbage percentage thresholds, as well as providing awareness or indication of application-side data deletion, including expired pages at the key-value store, e.g., underlying database storing (on memory) the key, values, or the like for the key-value engine, such as, PageStore, to the file system. Thus, a key-value engine system that includes key-value separation is provided that is more garbage collection-friendly, e.g., by reducing unnecessary data movement during garbage collection and compaction.

In an example embodiment, a method for garbage collection and compaction for a key-value engine in a data storage and communication system is provided. The method includes determining disk capacity usage of the key-value engine and adjusting a garbage collection garbage percentage threshold and a number of garbage collection threads based on whether the disk capacity usage of the key-value engine meets and/or exceeds predetermined disk capacity usage thresholds.

In an embodiment, the method may further include performing a periodic compaction process to consolidate one or more expired pages of one or more applications on a log-structured merge (LSM) tree by merging one or more layers into a last layer of the one or more expired pages to reduce data handling during an occurrence of the garbage collection.

In another embodiment, a proactive garbage collection system for a key-value engine is provided. The proactive garbage collection system includes an adaptive garbage collection module for implementing a flexible and adaptive garbage collection strategy, wherein the adaptive garbage collection module is configured to determine disk capacity usage of the key-value engine, and adjust a garbage collection percentage threshold and a number of garbage collection threads based on whether the disk capacity usage of the key-value engine meets and/or exceeds predetermined disk capacity usage thresholds.

In yet another embodiment, a non-volatile storage having stored thereon executable components is provided. The non-volatile storage having stored thereon executable components, which when executed by a processor, cause the processor to: determine disk capacity usage of a key-value engine; adjust a garbage collection garbage percentage threshold and a number of garbage collection threads based on whether the disk capacity usage of the key-value engine meets and/or exceeds predetermined disk capacity usage thresholds.

Thus, the methods and systems as discussed herein, may have one or more of the following advantages:

Accurate garbage collection management—In some embodiments, the key-value engine may be designed, programmed, or otherwise configured to consider the garbage rates at an entry level instead of at a space level, e.g., to select blog files with the highest garbage ratio/percentage, to address the issue of precise garbage collection scheduling. By having the key-value engine designed, programmed, or otherwise configured to consider garbage rates at the entry level, the blob file(s) may be selected with the highest garbage space for garbage collection to result in more efficient garbage collection operations. Additionally, the key-value engine may be enhanced by having garbage collection awareness, e.g., by being aware of application-side data deletion, including expired pages, that is in communication with the file system, e.g., via kernel file interface, application programming interface, or the like, to reduce unnecessary data movement. Moreover, periodical compaction processes may be used to clean up expired pages and further reduce unnecessary data movement during a garbage collection process.

Adaptive garbage collection—In some embodiments, the key-value engine may be designed, programmed, or otherwise configured such that the garbage collection process is flexible, diverse, concurrent, and has awareness of a physical capacity of the storage. For example, in some embodiments, the key-value engine may be designed, programmed, or otherwise configured to consider a wider range of garbage collection strategies, e.g., to improve concurrency when in high water levels or regions, and optimize space reclamation. As such, the overall garbage collection performance for the key-value engine may be significantly enhanced over prior key-value engines having garbage collection strategies that result in premature garbage collection which may to lead to additional write amplification problems, insufficient concurrency during high-water levels, and/or slow space reclamation.

Periodical compaction management—In some embodiments, the key-value engine may be designed, programmed, or otherwise configured to provide periodic compaction functionality, e.g., for cleaning up expired pages. In some embodiments, the periodical compaction may include merging multiple layers of the same page (or expired pages) in a log-structured merge (LSM) tree into the last layer, such that the upper layers can perform corresponding functions during the compaction process. By doing so, the amount of data subject to the garbage collection process may be reduced. Moreover, the key-value engine may be designed, programmed, or otherwise configured to prioritize the operation of the garbage collection and/or compaction, e.g., higher priority processes will be initiated before lower priority processes.

Garbage collection read amplification optimization—In some embodiments, the key-value engine may be designed, programmed, or otherwise configured such that the read amplification that occurs during garbage collection itself is reduced. For example, in some embodiments, a redundant set of keys may be stored at the end of a sorted string table (SST).

Optimization of hot and cold data—In some embodiments, the key-value engine may be designed, programmed, or otherwise configured to identify and segregate hot and cold data to reduce write amplification, especially for mixed data scenarios, in which when hot data becomes invalid, rewriting cold data becomes necessary to reclaim space, which results in additional WAF.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

FIGS. 4A and 4B are representations of separation indexing for a key-value engine, arranged in accordance with at least some embodiments described herein.

DETAILED DESCRIPTION

Figure 1:
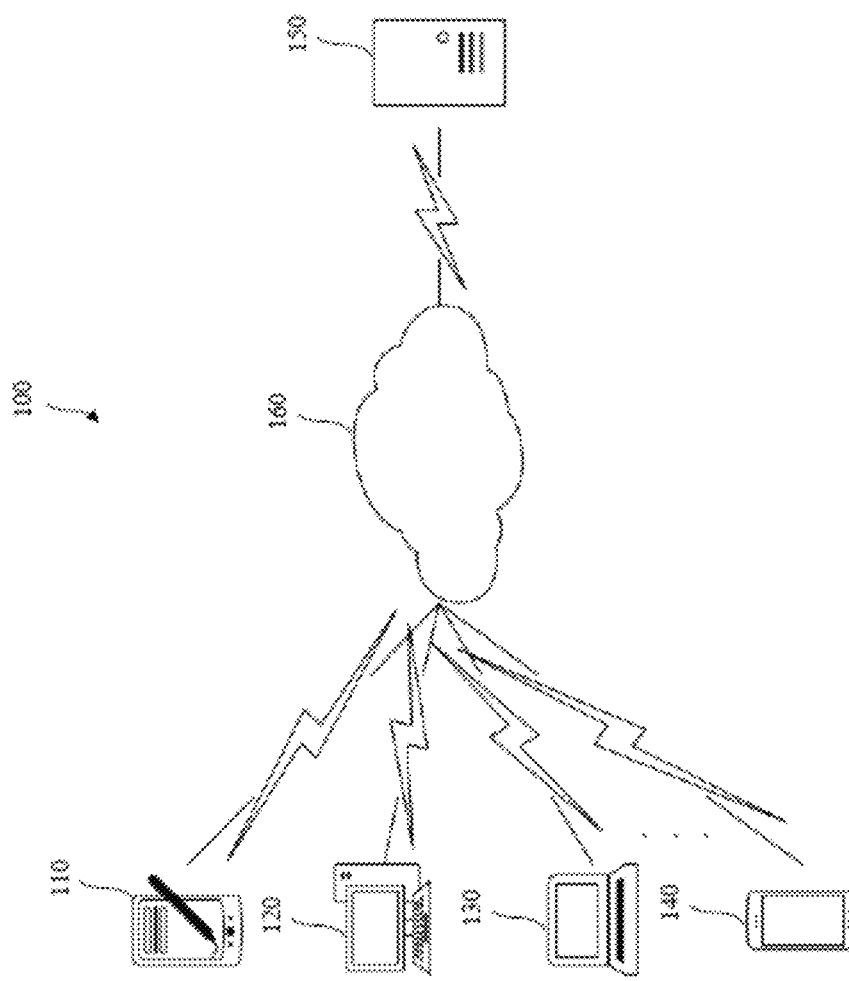
FIG. 1 is a schematic view of an example cloud-based storage system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "key-value engine" may refer to a network, algorithm, programs, software, hardware, firmware, or any combination thereof configured to or otherwise provide a key-value store for meeting a persistence requirement of cloud service providers. The key-value engine may be based on log-structured merge (LSM) tree architectures in which the key-values are separated to reduce write-amplification and/or resource contention. The key-value engine may be configured to store data in in-memory key-value stores (KVSes). In some embodiments, the LSM-tree may be used to achieve high-speed writes by buffering all updates in an in-memory structure, e.g., a MemTable. When the MemTable is full, the data may be flushed to persistent storage in a sorted-string table (SST), in which the SSTs are immutable. In some embodiments, in order to optimize read operations and reduce space usage, a compaction may be used to merge several SSTs into one to reduce overlaps, e.g., due to overlapping key ranges in multiple SSTs.

As referenced herein, a "blob file" is a term of art and may refer to object storage solutions for cloud services that may be binary files for storing the data outside of the LSM-tree, e.g., storing the value(s) in the separated key-value system. SST entries may include keys or pointers to one or more blob files, e.g., the blob files may be shared between one or more SST entries.

As referenced herein, a "module" may refer to a network, algorithm, programs, software, hardware, or any combination thereof configured or otherwise provided to perform the recited function.

While key-value separation processes may be used to reduce unnecessary data movement during compaction and garbage collection, the prior key-value engines may introduce overheads for ingesting data, e.g., substantial amount of unnecessary data movement during garbage collection and/or compaction. For example, the prior key-value engines may lack access to internal application information, e.g., application-side data deletion, which may lead to inefficient space usage, e.g., the key-value engine may not be configured to communicate and/or collaborate with the file system.

Methods and systems are described herein directed to optimizing garbage collection and/or compaction processes in key-value engine systems that overcome one or more of the above deficiencies of prior key-value engines. In some embodiments, the key-value engines, as described herein, are designed, programmed, or otherwise configured to provide one or more of the following features: awareness of application-side data deletion, including expired pages, e.g., communication and/or collaboration between the key-value engine and the file system; a flexible and diverse garbage collection process; a periodic compaction functionality; addressing of read amplification issues; and/or identifying and segregating hot and cold data, e.g., including compaction, rewriting, garbage collection, and the like. As such, the key-value engines, as described herein, are configured to proactively reclaim storage space without obstructing foreground client threads, for example, by being both capacity-aware and capable of dynamically adjusting the level of parallelism of garbage collection threads, e.g., dynamically adjusting garbage collection threads and garbage percentage thresholds, as well as providing awareness or indication of application-side data deletion, including expired pages at the PageStore to the file system. Thus, a key-value engine system that includes key-value separation is provided that is more garbage collection-friendly, e.g., by reducing unnecessary data movement during garbage collection and compaction.

Initially, it is appreciated that garbage management in key-value engines as discussed herein may include one or more of: 1) compaction, which is a process used to clean up garbage, e.g., unused memory space or data, on the page store side; 2) autocompaction, which is mainly used to maintain the LSM form while also handling garbage clean up on the page store side; 3) periodical compaction, which is used to address any residual garbage that might not have been identified for garbage collection during autocompaction; and 4) garbage collection, which is responsible for cleaning up garbage data within the key-value engine.

FIG. 1 is a schematic view of an example cloud-based storage system 100, arranged in accordance with at least some embodiments described herein.

The system 100 may include terminal devices 110, 120, 130, and 140, a network 160, and server(s) 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices and/or a digital or virtual device. The various electronic devices may include but not limited to a mobile device such as a smartphone, a tablet computer, an e-book reader, a laptop computer, a desktop computer, and/or any other suitable electronic devices or host for a browser or application.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services, such as a server for providing cloud services (including e.g., cloud storage, retrieval service, big data analytics, machine learning, data mining, etc.) to end users using one or more of the terminal devices 110, 120, 130, and 140. The server 150 may be implemented in a server system that includes a distributed server cluster including multiple servers 150 or that includes a single server. In some embodiments, one or more server systems may be in communication with each other over network 160. The server 150 may also include a controller for controlling the hardware and/or storing software and firmware and providing the functionalities of the server.

In some embodiments, the server(s) 150 may include or be in communication with storage device(s), e.g., non-volatile memory (NVM) solid state drives (SSDs), e.g., flash memory, using various communication interfaces that allow for quick data storage and/or retrieval on/from the storage device(s).

An end user may use one or more of the terminal devices 110, 120, 130, and 140 to interact with the server(s) 150 via the network 160. In some embodiments, various applications, such as social media applications, social networking applications, shopping applications, gaming applications, metadata management, or the like, may be installed on the terminal devices 110, 120, 130, and 140. In some embodiments, the end user may request big data analytics or data mining on data on the storage devices connected to the server(s) 150 and/or data residing or provided to the cloud computing system for supporting data analytics, learning models or the like.

It is to be understood that software applications or services according to the embodiments described herein and/or according to the services provided by the cloud service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that in a case that a service is not performed remotely, the system 100 may not include the network 160, but include only the terminal device 110, 120, 130, and 140, and/or the server 150.

It is further to be understood that the terminal device 110, 120, 130, and 140, and/or the server 150 may each include one or more processors, firmware, and a storage device storing one or more programs. The terminal device 110, 120, 130, and 140, and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
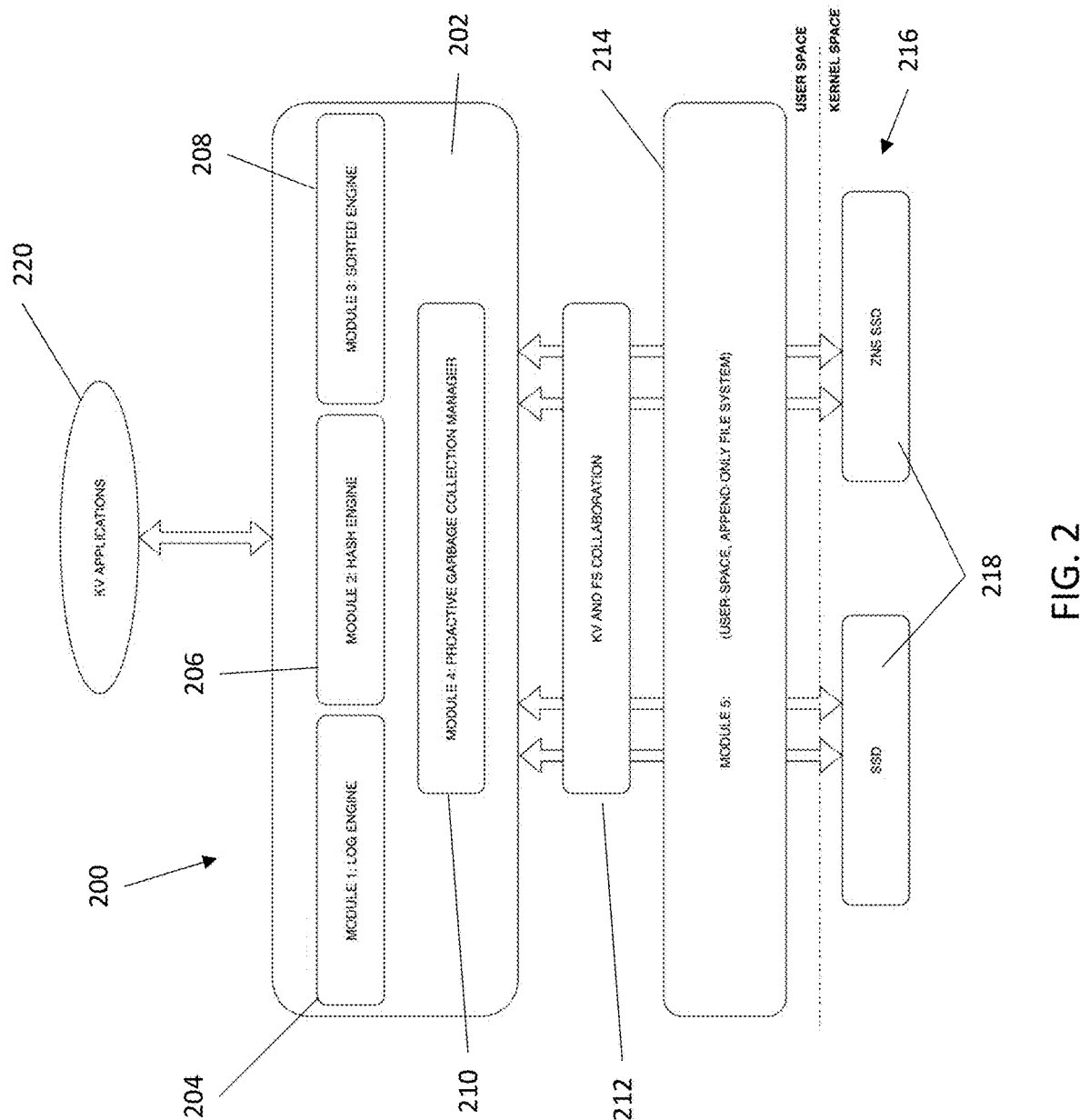
FIG. 2 is an example embodiment of a key-value store and file system, arranged in accordance with at least some embodiments described herein.

FIG. 2 shows a schematic of a key-value store and file system according to an embodiment. Key-value store and file system 200 includes key-value engine 202. Key-value engine 202 may include one or more of a log engine 204, a hash engine 206, a sorting engine 208, and a garbage collection manager module 210. Key-value store and file system 200 may further include a collaboration layer 212 and file system 214. Key-value store and file system 200 may interact with a kernel space 216, kernel space 216 including one or more disks 218. The key-value store and file system 200 may also interact with applications 220.

Key-value store and file system 200 may be used for data storage in cloud applications, for example to provide data persistence required by cloud services. Key-value engine 202 may be configured to provide a key-value store, for example as part of a storage backend for cloud services. Non-limiting examples of cloud services using key-value engines 202 include internet-based shopping, social media, metadata management, and the like. File system 214 may be a dedicated user-level append-only file system configured to provide storage specialized to facilitate operation of key-value engine 202.

Log engine 204 may be configured to allow concurrent writing of multiple log files, thereby reducing the number of compaction and garbage collection operations. The logs written by log engine 204 may be configured such that strong sorting is not required for handling of said logs. Log engine 204 may be configured to improve throughput performance issue in log writes and increase recovery speed by reducing the sync write overhead of logs from multiple input/output (I/O) operations to a single I/O operation, aggregating writes using a lock-free queue to control latency and improve throughput, and/or providing asynchronous interfaces to enhance the thread model. The key-value engine 202 and file system 214 may be integrated and configured to collaborate with each other, the log engine 204 may be used to store a write-ahead log (WAL) having a predefined structure having a defined actual file size. The defined file size for the WAL can in turn result in requiring fewer I/O operations, thereby enhancing performance while mitigating potential tradeoffs regarding data consistency.

Hash engine 206 may be configured to handle point queries within the key-value engine 202. In particular, hash engine 206 is configured to reduce tail latency in point queries. The hash engine 206 includes separation of data and index components, and maintenance of the index in a cache memory, for example by compression of the index and/or caching of partial data. The partial data can be selected using, for example, a least recently used strategy.

Sorting engine 208 may be configured to carry out range scan operations while reducing the write-amplification factor and/or read/write latency associated with such operations. Sorting engine 208 is configured to use a partitioned log-structured merge (LSM) tree. The classification of I/O flows and scheduling of tasks can further be carried out by sorting engine 208.

Garbage collection manger module 210 may be configured to carry out garbage collection and/or compaction operations in key-value store and file system 200. The garbage collection manager module 210 may be configured to reduce unnecessary data movement during garbage collection and/or compaction operations in the key-value store and file system 200. The garbage collection manager module 210 may conduct garbage collection and/or compaction operations based on awareness regarding application-side data deletion such as expiration of pages. Garbage collection and compaction carried out by garbage collection manager module 210 may be configured to arrange the data to support other modules such as sorting engine 208. The garbage collection manager module 210 may be configured to coordinate preservation of data during the garbage collection and/or compaction operations.

Collaboration layer 212 may be configured to facilitate collaboration between key-value engine 202 and file system 214. Collaboration layer 212 can further facilitate efficient compaction and/or garbage collection operations in key-value engine 202 based on the collaboration between the key-value engine 202 and file system 214. The collaboration can reduce write amplification issues arising from compaction and/or garbage collection operations. In an embodiment, the collaboration layer 212 can expose zone usage information from key-value engine 202 to the file system 214.

File system 214 may be configured to split data from logs and use log-structured append-only writing as the write model. In an embodiment, the file system can further provide pre-allocated data space where sync writes only occur for the persistence of data, and in an embodiment, do not need to make metadata persistent. In an embodiment, the data persistence for different files and global log persistence can be executed separately. These aspects of the file system can allow the file system to avoid some metadata persistence operations, such as those caused by single data write persistence operations.

The file system 214 may be configured to support general files and instant files. Both general and instant files can be written sequentially, and both can be read either sequentially or randomly. General files can be optimized for consistently low latency in either sequential or random reads. General files can be used for writing data in batches that do not require flushing the data to disk after each write, such as SST files. The storage space is allocated in large units, with a non-limiting example of unit size being 1 MB each. The large allocation unit can reduce metadata size for general files, such that metadata of all general files can be kept in memory during normal file system operation. By keeping the metadata in memory, no read operation to general files would require further I/O for metadata access, regardless of the read offset. This can reduce read tail latency for general files. Instant files can be optimized for fast, incremental synchronous writes while having good sequential and random read performance near the tail. Instant files can be used for writing data that requires frequent flushing to disk for instant durability, such as write-ahead log files of the key-value system. The data and metadata of each individual write can be bundled together for instant files. The bundled data and metadata can be written to a journal file shared by all instant files. The bundling of data and writing to the journal file can improve the speed of incremental write and sync operations. This approach is structured to support sequential reads, but can have tradeoffs regarding random reads. Since instant files are expected to be mostly read sequentially, with random reads mostly concentrated near the tail most recently written data of each instant file that is actively being written can be cached to improve read performance.

The file system 214 can include a user-space I/O scheduler to assign I/O priority to different I/O types. The I/O scheduler will mark foreground I/O as high priority while background I/O will be marked as low priority. In addition, the key-value engine 202 may include a scheduler to schedule its background tasks in order to ensure that each I/O issued by the upper layer applications has a consistent I/O amplification. Through this co-design of I/O scheduling in both key-value engine 202 and file system 214, the tail latency can be kept stable and low as both the I/O amplification and I/O latency are consistent. Moreover, reading general files from the file system requires no I/O for metadata, and use of large spaces for the general files can ensure that most read operations require a single I/O.

Kernel space 216 can contain disks 218. Disks 218 can include one or more storage media, such as solid state drives (SSDs). In an embodiment, at least some of disks 218 are zoned storage (ZNS) SSDs.

Applications 220 may be any suitable applications utilizing the key-value store and file system 200, for example, online shopping, social media, metadata management applications, or the like. The applications 220 may interface with key-value store and file system 200 through any suitable application programming interface (API). In an embodiment, the API can be specific for the particular type of file, for example having the nature of the files as general files or instant filed be determined by the API through which the file has been received.

Figure 3:
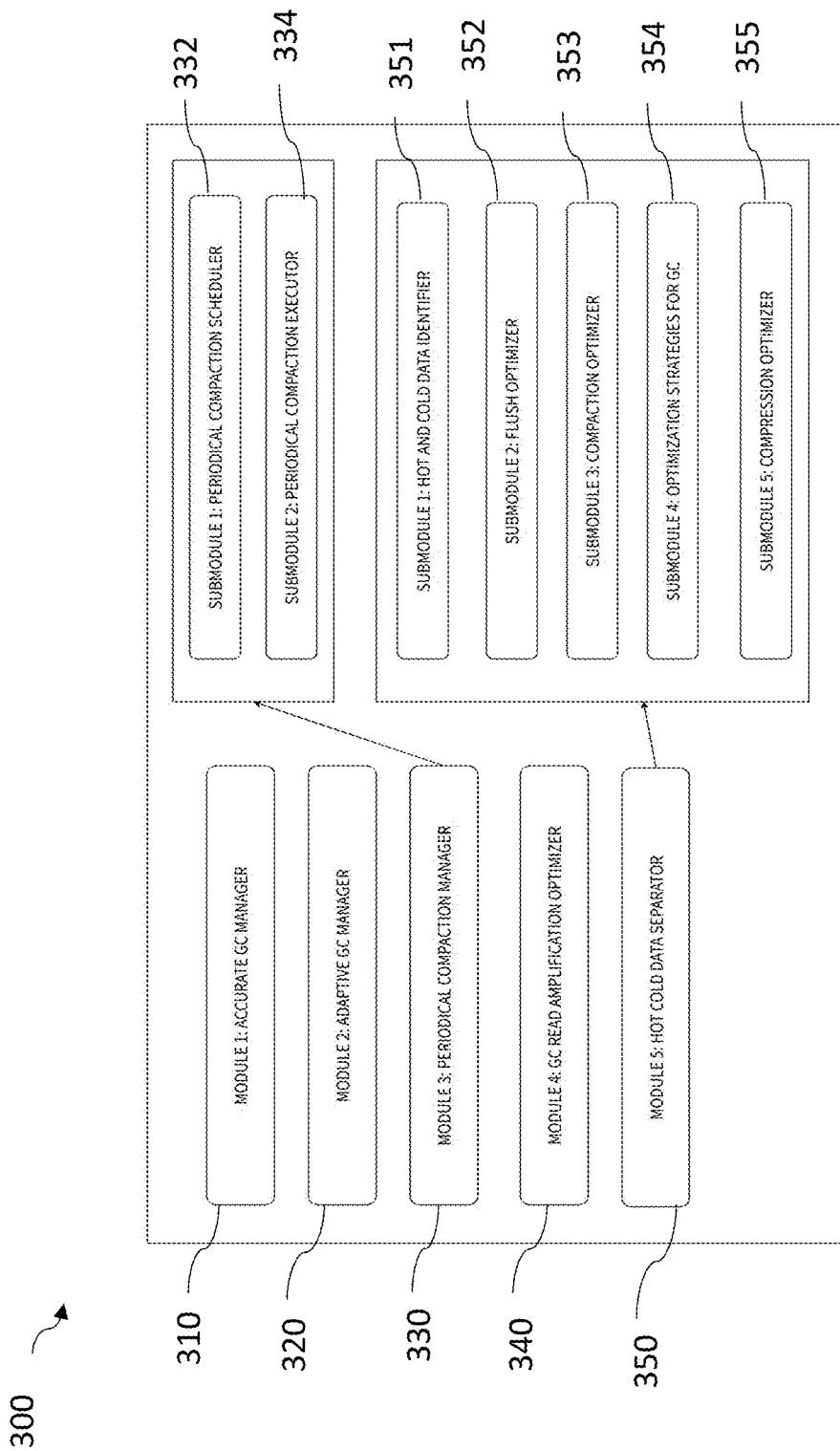
FIG. 3 is a schematic representations of a proactive garbage collection module, arranged in accordance with at least some embodiments described herein.

FIG. 3 is a schematic representation of an example proactive garbage collection module 300 in a key-value engine, e.g., 202 in FIG. 2, for optimizing garbage collection and/or compaction processes in key-value engine systems, arranged in accordance with at least some embodiments described herein. In some embodiments, the proactive garbage collection module 300 may be configured to proactively reclaim storage space without obstructing foreground client threads, e.g., CPU utilization, by being both capacity-aware and capable of dynamically adjusting the level of parallelism of garbage collection threads. Furthermore, the proactive garbage collection module 300 may be configured to have awareness of application-side data deletion such that the proactive garbage collection module 300 may coordinate garbage collection and/or compaction with any underlying file system, e.g., to minimize unnecessary data movement by communicating garbage collection information (at the key-value engine level) and/or other monitored information to the file system, e.g., via an interface, such as, application programming interface (API), kernel file interface, or the like. In order to perform the above operations, the proactive garbage collection module 300 may include one or more of an accurate garbage collection manager module 310, an adaptive garbage collection manager module 320, a periodical compaction manager module 330, a garbage collection read amplification optimizer module 340, and/or a hot/cold data separator module 350. The accurate garbage collection manager module 310, the adaptive garbage collection manager module 320, the periodical compaction manager module 330, the garbage collection read amplification optimizer module 340, and/or the hot/cold data separator module 350 may be configured to cooperate with the other modules to optimize the garbage collection and/or compaction processes or may be operable independent of the other remaining modules, e.g., operable simultaneously as background operations.

The accurate garbage collection manager module 310 may be designed, programmed, or otherwise configured to provide more accurate information of valid garbage volume for garbage collection, for example, by being configured to be a communication or collaboration interface between the key-value engine and the file system, such that the file system and/or key-value engine is informed or made aware of internal garbage collection and/or compaction processes. For example, in some embodiments, the accurate garbage collection manager module 310 may be configured to precisely measure the garbage volume within blob files, e.g., by taking into account the actual data size of key-value pairs. As such, the key-value engine may include an occurrence of garbage collection to enable selection of files based on more informed and accurate choices for garbage collection to improve overall disk space utilization and garbage collection efficiency. Moreover, the accurate garbage collection manager module 310 may be configured to consider garbage rates at the entry level instead of the space level. By improving garbage collection calculation at the entry level, the selection of the blob file with the highest garbage space may be ensured, resulting in more efficient garbage collection operations or strategies, e.g., reduction in tail latency, especially when occurrences of garbage collection occur on both the key-value engine and the file system, e.g., to reduce unnecessary data movement of expired or deleted files/data.

Figure 4C:
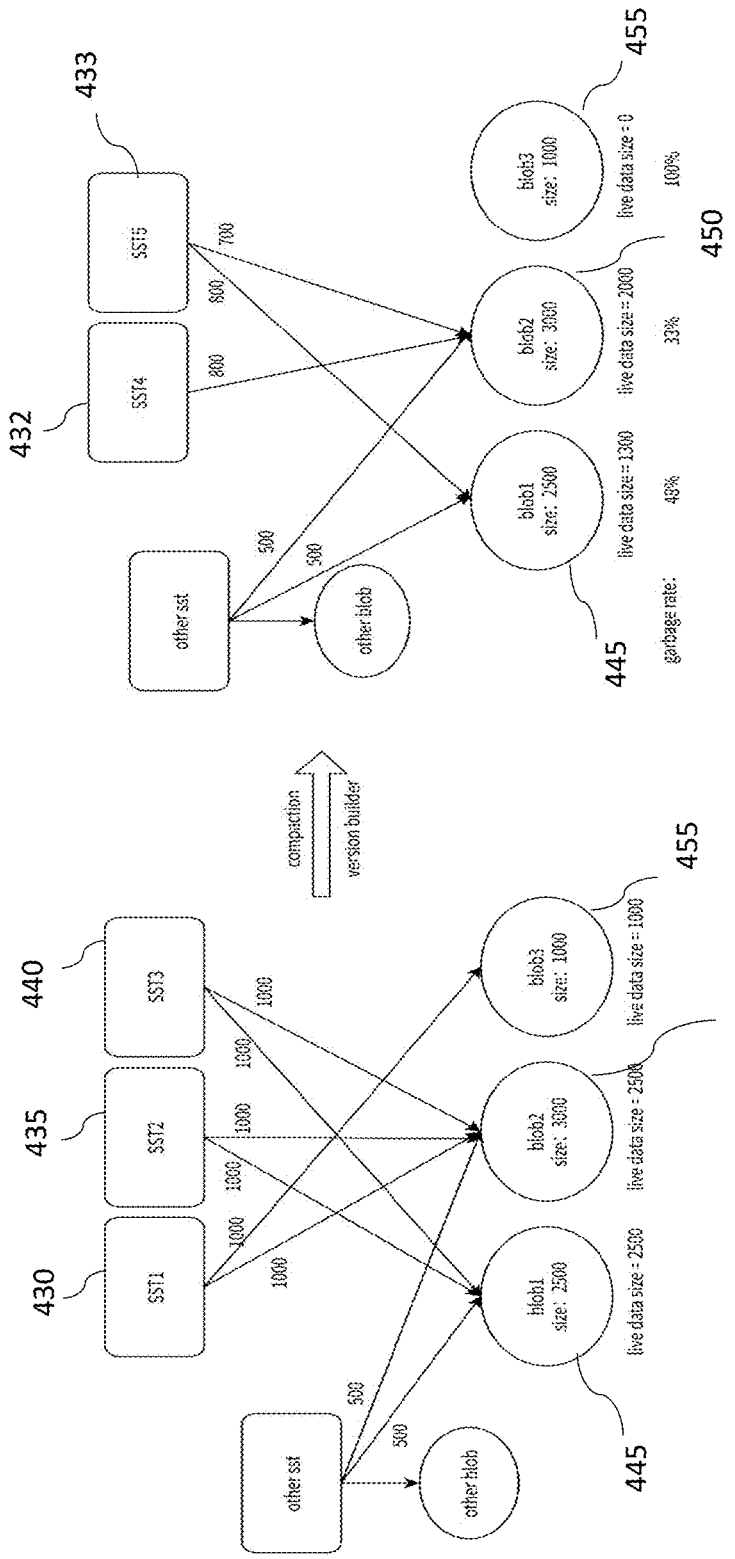
FIG. 4C is an illustrative example for a determination and/or calculation for a garbage ratio or rate of blob files, in accordance with at least some embodiments described herein.

FIGS. 4A, 4B, 4C illustrate example embodiments of the key-value engine having the accurate garbage collection manager as discussed herein.

FIG. 4A is an illustrative example of a prior key-value engine having separation indexing for the key-value pair 405, 410, in which the file number of each key-value pair is stored in the key 405 for the LSM tree entry, e.g., key, file number, offset, and size of the entry, for the corresponding blob file, e.g., value 410, e.g., in the SST. While such indexing in prior key-value engines allows the appending of key-value pairs, such prior key-value separation indexing techniques does not include data, e.g., information, regarding the size of the separated key-value data, e.g., may only include the number of data entries that each SST entry relies on in various blob files, but not the size of the value data itself. While it may be possible to calculate the garbage ratio based on the number of entries and select files for an occurrence of garbage collection, such determination may result in imprecise file selection, incomplete capacity release, and increased CPU usage for garbage collection. Thus, when the prior key-value engine is configured to determine and/or select the files for the occurrence of garbage collection, the prior key-value engines may only rely on the count of expired entries to make decisions on the files for garbage collection. Since the data sizes within blob files may vary significantly, relying solely on the entry count for statistics may not be precise. As such, the prior key-value engines could potentially overlook files with a relatively low number of expired entries but contain a significant amount of garbage data, e.g., size of garbage data, which despite having a lower priority in the garbage collection scheme, might remain on the disk for an extended period of time, leading to wasted disk space.

FIG. 4B is an illustrative embodiment of an operation of the accurate garbage collection module 310, in which the key-value engine is designed, programmed, or otherwise configured to store the key-value pair 415, 420 in the LSM tree, e.g., in SSTs in each level of the LSM tree. In some embodiments of the key-value separation, a linkage between the keys and data may be stored in KeySST files, while the data content itself may reside in other files, such that compaction may only need to trigger keys to relocate less data. In some embodiments, the LSM tree entry key 415 may include the key and file number for the corresponding blob file, e.g., value 420, for each key-value pair, and the LSM tree may further include the value size of the blob file, e.g., in index or delta-block 425. By including the value size of the blob file, the key-value engine may be designed, programmed, or otherwise configured such that the garbage ratio or rate for each blob file may be calculated, e.g., based on size of the blob file and available size of the blob file, as further discussed below, to make better informed and/or more accurate selection of blob files for the occurrence of garbage collection. That is, by having the key-value engine configured to store the file number along with the value size of the blob files in the LSM tree, the key-value engine is configured to have a more precise file selection process, a more complete capacity release process, and a decreased CPU usage during the garbage collection process, by being able to select the blob files with the highest amount of garbage data. In some embodiments, the key-value engine may be designed, programmed, or otherwise configured such that the delta block is configured to only store the value size, without storing the key, thus reducing the space occupied by any additional keys. As such, in some embodiments, the key-value engine may be configured to store a bitmap indicating whether each key-value pair is separated (along with some auxiliary information), such that various operations, such as Seek, may be supported without explicitly storing the key in scenarios where the key is not needed. Thus, since data in the delta block is only used during compaction, e.g., meaning that the delta block is accessed only once within the lifecycle of the SST, the storage cost of the delta block may be minimized and/or read costs may be kept low.

FIG. 4C is an illustrative embodiment of the determination and/or calculation of the garbage ratio or rate of blob files by the key-value engine, according to some embodiments. As discussed above, the SST of the LSM tree may be used to store the data size of the blob file (along with the file number and key). As such, the key-value engine may be configured to determine and/or calculate a garbage ratio or rate of the blob files, for example, during compaction, using the data size. In an embodiment, the key-value engine may be configured to determine the total live data size of the blob file based on the SST entries, e.g., the summation of the live data sizes for all SST entries that depend on a particular blob file to determine an effective data size of the blob file(s). Since the total used size of the blob file is known, the amount of garbage data may be determined by the difference of the total used size of the blob file, e.g., remaining size, and the summation of the live data size from the SST entries. As such, the garbage ratio or rate may be determined for each blob file.

For example, referring back to FIG. 4C, in an example embodiment during compaction, the key-value engine may be configured to perform a comprehensive scan of all SSTs 430, 435, 440 to construct a dependency graph of the SSTs 430, 435, 440 and the corresponding blob files 445, 450, 455. After compaction, the SSTs 430, 435, 440 may be compacted to SSTs 432, 433 that depend on blob files 445, 450, 455. As such, the garbage ratio or rate of the blob files may be determined based on the summation of the live data size and the total used size of the blob file. For example, blob1 445 may have a total used size of 2500, with the SST entry 433 depending on blob1 445 having a live data size of 800 and other SST depending on blob1 445 having a live data size of 500. As such, blob1 445 has a live data size of 1300 with the total used size of 2500, such that the garbage data may be determined as the difference between the total used size and the live data size, and in which blob1 445 has a garbage rate of 48%.

As such, the key-value engine having the accurate garbage collection manager module 310 may be designed, programmed, or otherwise configured to provide more accurate information of valid garbage volume for garbage collection, for example, by being configured to determine the garbage ratio or rate at the entry level, rather than at the space level to improve overall disk space utilization and garbage collection efficiency for garbage collection occurrences, e.g., execution of an occurrence of garbage collection, especially when occurrences of garbage collection occur on both the key-value engine and the file system, e.g., independent reclaiming of memory at both the key-value engine and the file system.

The adaptive garbage collection manager module 320 may be designed programmed, or otherwise configured to make garbage collection decisions based on multiple real time factors, such as, user's actual disk capacity usage, user's capacity (including LSM amplification), disk utilization (LSM amplification and blob file garbage ratio), disk utilization to trigger garbage collection, disk utilization to trigger stop writing, disk overprovisioning, guaranteed performance utilization, key-value engine garbage ratio, LSM and PageStore garbage ratio, max space, the user can use, garbage collection goal to reduce write traffic amount, etc. In some embodiments, the adaptive garbage collection manager module 320 may be configured to perceive capacity usage, e.g., using system interfaces to scan the sizes of all files in the current directory of the instance. In some embodiments, the adaptive garbage collection manager module 320 may be configured to dynamically adjust garbage collection thresholds, bandwidth, and concurrency based on the capacity availability/usage, without affecting other tasks, such as, background compaction. For example, in some embodiments, disk capacity may be determined and the garbage collection percentage threshold and the number of garbage collection threads may be adjusted according to predetermined strategies, such as, actual capacity, LSM amplification, blob file garbage ratio or rate, garbage collection triggers, triggers to stop writing, disk overprovisioning, guaranteed performance utilization, key-value engine garbage ratio, LSM and PageStore garbage ratio, max space, or the like. In some embodiments, to prevent an excessive number of garbage collection threads from affecting other tasks such as background compaction, the thread pool model may be optimized by separating garbage collection threads and allocating them as needed, e.g., based on the disk capacity usage.

Figure 5A:
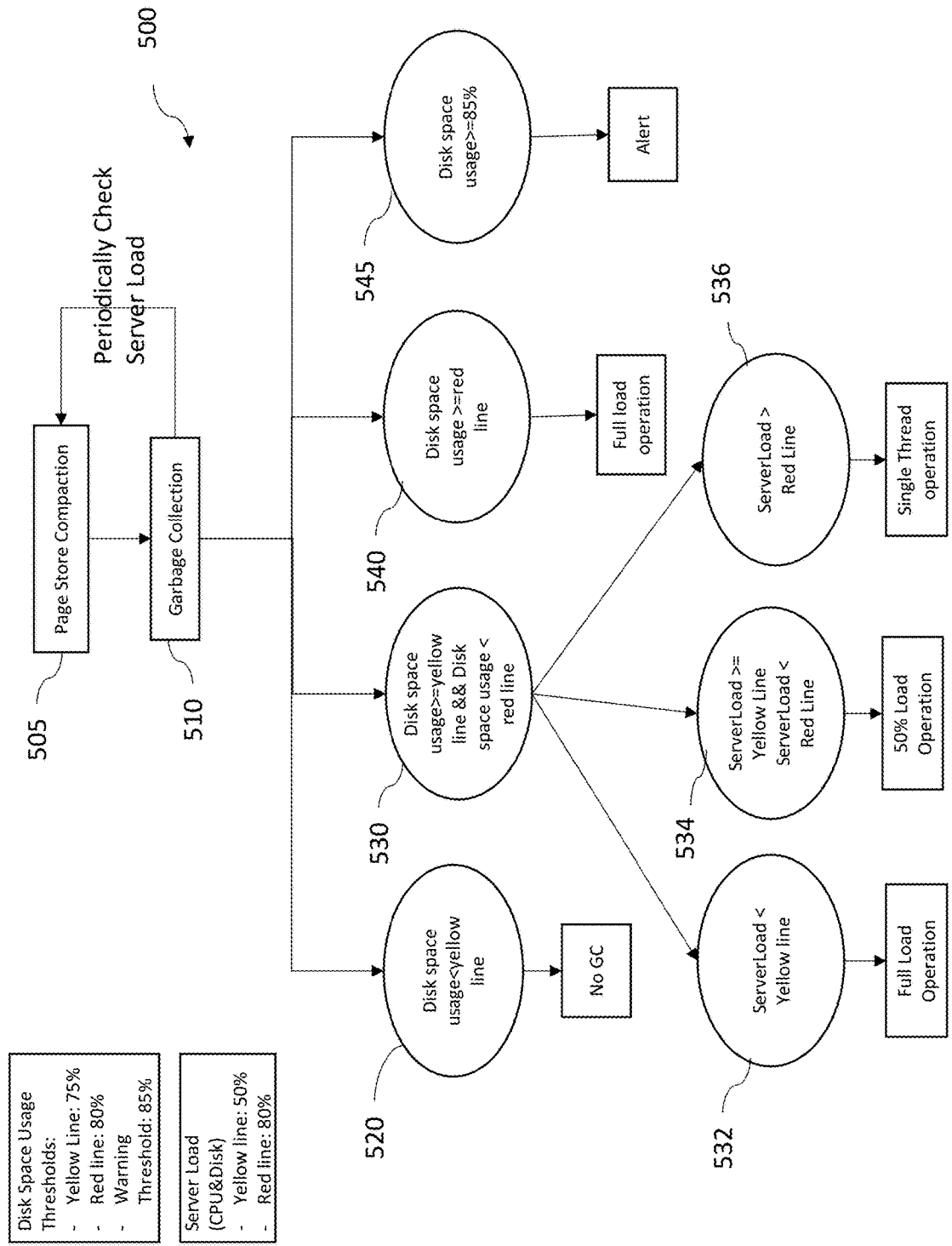
FIGS. 5A and 5B are illustrative examples of operations or process flows for an adaptive garbage collection manager, in accordance with at least some embodiments described herein.
Figure 5B:
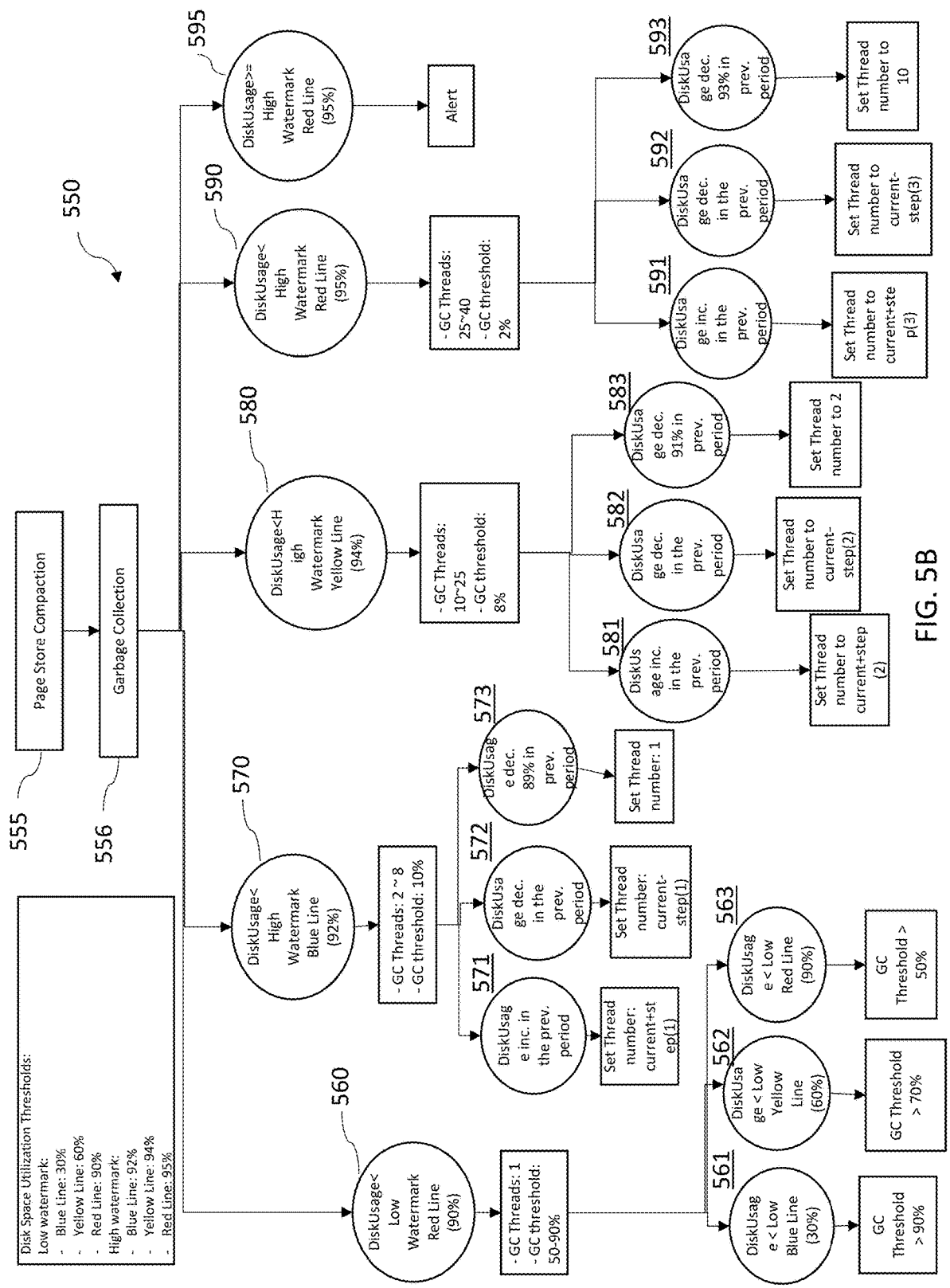

FIGS. 5A and 5B are illustrative examples of operations or process flows of the adaptive garbage collection manager module 320 for disk space utilization according to various embodiments. The adaptive collection manager module 320 may be designed, programmed, or otherwise configured to manage the disk space utilization of the system based on different disk capacity usages, e.g., water level ranges, such that the garbage collector thread count and garbage collection threshold may be dynamically adjusted based on whether the disk capacity usage/disk space utilization meets and/or exceeds predetermined threshold values.

FIG. 5A illustrates an example operation of process flow 500 for disk space utilization. It is to be understood that the process flow 500 or operation can include one or more operations, actions, or functions as illustrated by one or more of blocks 505, 520, 530, 532, 534, 536, 540, and 545. For example, in an embodiment, the garbage collection percentage threshold and the number of garbage collection threads may be adjusted when disk space utilization is below a first predetermined threshold, the number of garbage collection threads is set to a first thread value, e.g., one, and the garbage collection (GC) percentage threshold is dynamically set between a first GC percentage threshold, e.g., 50%, and a second GC percentage threshold, e.g., 90%, based on disk usage; and when the disk space utilization is between a second predetermined threshold and a third predetermined threshold, the number of garbage collection threads and the garbage collection percentage threshold are dynamically adjusted, in which the dynamic adjustment includes increasing or decreasing the number of garbage collection threads and/or the garbage collection percentage threshold based on the disk space utilization and/or whether the disk usage increases or decreases, as further discussed below. These various operations, functions, or actions may, for example, correspond to software, firmware, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Additionally, it is to be understood that the determination of the disk capacity usage may be continuous and/or checked or determined periodically, e.g., every minute, two minutes, five minutes, etc. It is to be understood that before the processing flow, operations including initializations or the like may be performed.

Process flow 500 may begin at block 505.

At block 505 (Page Store Compaction), the processor for the adaptive garbage collection manager module 320 may be designed, programmed, or otherwise configured to determine whether or not the page store should be compacted, e.g., based on the maximum disk space allocation per block and disk space utilization thresholds and/or expired or deleted data or files. In some embodiments, the key-value engine may be configured such that the server load may be periodically checked, e.g., GetServerLoad command, after a garbage collection process for the key-value engine. The process flow may proceed to block 510.

At block 510 (Garbage Collection), the processor for the adaptive garbage collection manager module 320 may be designed, programmed, or otherwise configured to optimize the disk space utilization, for example, by dynamically adjusting the adaptive garbage collection process. The dynamic adjustment of the adaptive garbage collection process may be based on various predetermined disk capacity usages (or disk space utilization), the server load, or the like. For example, in an embodiment, the dynamic adjustment of the adaptive garbage collection process may be based on blocks 520, 530, 540, 545 and may be based on the continuous or periodic determination of the disk capacity usage.

At block 520, (Disk space usage<yellow line), the processor for the adaptive garbage collection manager module 320 may be designed, programmed, or otherwise configured to determine the disk space usage. If the adaptive garbage collection manager module 320 determines that the disk space usage is below the yellow line, e.g., 75%, no occurrence of garbage collection is initiated, e.g., optimization of disk space is not required.

At block 530, (Disk space usage>=yellow line and disk space usage<red line), the processor for the adaptive garbage collection manager module 320 may be designed, programmed, or otherwise configured to determine the disk space usage, in which if the disk space usage is greater than or equal to the yellow line threshold, e.g., 75%, and below the red line threshold, e.g., 80%, the adaptive garbage collection manager module 320 may be further configured to dynamically adjust operation of the key-value engine to optimize disk space based on the server load, e.g., CPU and disk. For example, in an embodiment, the dynamic adjustment of the operation may be based on blocks 532, 534, 536.

At block 532 (Serverload<Yellow line), the processor for the adaptive garbage collection manager module 320 may be designed, programmed, or otherwise configured to determine the server load, in which if the server load is less than the yellow line threshold, e.g., 50%, a full load operation is initiated.

At block 534 (Serverload>=Yellow Line and Serverload<Red Line), the processor for the adaptive garbage collection manager module 320 may be designed, programmed, or otherwise configured to determine the server load, in which if the server load is greater than or equal to the yellow line threshold, e.g., 50%, but less than the red line threshold, e.g., 80%, a 50% load operation is initiated.

At block 536 (Serverload>Red Line), the processor for the adaptive garbage collection manager module 320 may be designed, programmed, or otherwise configured to determine the server load, in which if the server load is greater than the red line threshold, e.g., 80%, a single thread operation is initiated.

At block 540 (Disk space usage>=red line), the processor for the adaptive garbage collection manager module 320 may be designed, programmed, or otherwise configured to determine the disk space usage, in which if the disk space usage is greater than or equal to the red line threshold, e.g., 80%, full load operation is initiated.

At block 545 (Disk space usage>=85%), the processor for the adaptive garbage collection manager module 320 may be designed, programmed, or otherwise configured to determine the disk space usage, in which if the disk space usage is greater than or equal to the warning threshold, e.g., 85%, an alert operation is initiated, e.g., user or controller for the cloud based service is alerted of high disk space usage or an alert is generated at the PageStore.

As such, the adaptive garbage collection manager module 320 may be designed programmed, or otherwise configured to make garbage collection optimization decisions based on multiple real time factors, such as, disk capacity usage, capacity reported by PageStore LSM tree, such that the adaptive garbage collection manager module 320 may be configured to dynamically adjust garbage collection thresholds, bandwidth, and/or concurrency based on the capacity availability/usage, for example, without affecting other tasks, such as, background compaction.

FIG. 5B illustrates another example operation of process flow 550 for disk space utilization. It is to be understood that the process flow 550 or operation can include one or more operations, actions, or functions as illustrated by one or more of blocks 555, 556, 560, 561, 562, 563, 570, 571, 572, 573, 580, 581, 582, 583, 590, 591, 592, 593, and 595. These various operations, functions, or actions may, for example, correspond to software, firmware, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. While predetermined threshold values for the watermark levels for low water and high water levels or regions are provided, it is understood that such disclosure is not intended to be limiting. Rather, the predetermined watermark levels are provided as exemplary embodiments in which different threshold values may be used based on the desired outcomes for disk space utilization. Additionally, it is to be understood that the determination of the disk capacity usage may be continuous and/or checked or determined periodically, e.g., every minute, two minutes, five minutes, etc. It is to be understood that before the processing flow, operations including initializations or the like may be performed.

Processing flow 550 may begin at block 555.

At block 555 (Page Store Compaction), the processor for the adaptive garbage collection manager module 320 may be designed, programmed, or otherwise configured to determine whether or not any pages in the page store should be compacted, e.g., based on the maximum disk space allocation per block and disk space utilization thresholds and/or expired or deleted data or files. In some embodiments, the key-value engine may be configured such that the server load may be periodically checked, e.g., GetServerLoad command, after a garbage collection process for the key-value engine. The processing flow may proceed to block 556.

At block 556 (Garbage Collection), the processor for the adaptive garbage collection manager module 320 may be designed, programmed, or otherwise configured to optimize the disk space utilization, for example, by dynamically adjusting the adaptive garbage collection process. The dynamic adjustment of the adaptive garbage collection process may be based on various predetermined disk capacity usages, the server load, or the like. For example, in an embodiment, the dynamic adjustment of the adaptive garbage collection process may be based on blocks 560, 570, 580, 590, 595 and may be based on the continuous or periodic determination of the disk capacity usage. In an example embodiment, the adaptive garbage collection manager module 320 may include one or more predetermined disk space utilization thresholds for dynamically setting the garbage collection threads and garbage collection thresholds, which may include low watermark thresholds for low water levels or regions, e.g., for disk space utilization below 90%, and high watermark thresholds for high water levels or regions, e.g., above 90%, e.g., 92% to 95%. The low watermark thresholds may include a blue line threshold of 30%, a yellow line threshold of 60% and a red line threshold of 90%. The high watermark thresholds for disk space utilization between 92% and 95% may include a blue line threshold of 92%, a yellow line threshold of 94%, and a red line threshold of 95%. While the predetermined disk space utilization thresholds are described herein, such disclosure is not intended to be limiting, as other threshold values may be set based on the optimization strategy. As such, the processor for the adaptive garbage collection manager module 320 may be designed, programmed, or otherwise configured to optimize the disk space usage and set the garbage collection threads and garbage collection thresholds based on the predetermined disk space utilization thresholds and the following operations of the adaptive garbage collection manager module 320.

At block 560 (Disk usage<low watermark red line), if the adaptive garbage collection manager module 320 determines that the disk space utilization is at a low watermark threshold, e.g., below the red line threshold for the low watermark threshold, e.g., 90%, the disk space usage is considered to be in the low water level region and adaptively controlled based on the low watermark thresholds. The adaptive collection manager module 320 may be configured to set the garbage collection thread at a first thread value, e.g., 1, and the garbage collection threshold may dynamically set between a first GC percentage threshold and a second GC percentage threshold, e.g., 50% to 90%, based on the disk usage, e.g., DiskUsage, at the low watermark levels. For example, in an embodiment, at 561, if the adaptive garbage collection manager module 320 determines that the disk usage is less than 30%, the garbage collection thread may remain at 1 and the garbage threshold may be set at or greater than 90%. At 562, if the adaptive garbage collection manager module 320 determines that the disk usage is less than 60%, the garbage collection thread may remain at 1 and the garbage threshold may be set at or greater than 70%. At 563, if the adaptive garbage collection manager module 320 determines that the disk usage is less than 90%, the garbage collection thread may remain at 1 and the garbage threshold may be set to at or greater than 50%.

If the adaptive garbage collection manager module 320 determines that the disk space utilization is at the high watermark threshold, e.g., a second predetermined threshold and a third predetermined threshold, e.g., between 90% and 95%, the disk space usage is considered to be in the high water level region, and the adaptive garbage collection manager module 320 is configured to dynamically adjust the garbage collection thread count and garbage collection thresholds based on the high watermark thresholds, in which the dynamic adjustment includes increasing or decreasing the number of garbage collection threads and/or the garbage collection percentage threshold based on the disk space utilization and/or whether the disk usage increases or decreases, as discussed below, with respect to blocks 570, 580, 590, 595.

At 570 (Disk usage<high watermark blue line), if the adaptive garbage collection manager module 320 determines that the disk space usage is less than the blue line of the high watermark threshold, e.g., 92% (but greater than the red line low watermark threshold), the adaptive garbage collection manager module 320 may be configured to set the garbage collection threshold at 10% while the garbage collection thread may be dynamically adjusted between 2 and 8 threads based on an increase or decrease of the disk usage, as discussed herein with respect to blocks 571, 572, 573. For example, in an embodiment, at 571, if disk usage increases within a predetermined time frame, e.g., a 15-second, 30-second, 60-second, 90-second period, the garbage collection thread count may increase by 1, and may be limited to a maximum of 8 threads. At 572, if the disk usage decreases within the same predetermined time frame, the garbage collection thread count may decrease by 1, and may be limited to a minimum of 2 threads. At 573, if the disk usage drops to 89%, e.g., below the red line for the low watermark threshold—[Delta], the garbage collection thread count may be set back to 1.

At 580 (Disk usage<High watermark yellow line), if the adaptive garbage collection manager module 320 determines that the disk space usage is less than the yellow line of the high watermark threshold, e.g., 94% (but greater than the blue line for the high watermark threshold), the adaptive garbage collection manager module 320 may be designed, programmed, or otherwise configured to set the garbage collection threshold at 8% while the garbage collection thread count may be dynamically varied between 10 to 25 based on an increase or decrease of the disk usage, as discussed herein with respect to 581, 582, 583. In an embodiment, at 581, if the disk usage increases within the predetermined time frame, the garbage collection thread count may be increased by 2, and may be limited to a maximum of 25. At 582, if the disk usage decreases with in the same predetermined time frame, the garbage collection thread count may decrease by 2, and may be limited to a minimum of 10. At 583, if the disk usage drops to 91%, e.g., below the blue line for the high watermark threshold—[Delta], the garbage collection thread count may be set to 2.

At 590 (Disk usage<high watermark red line), if it is determined that the disk space usage is less than the red line of the high watermark threshold, e.g., 95% (but greater than the yellow line for the high watermark threshold), the adaptive garbage collection manager module 320 may be designed, programmed, or otherwise configured to set the garbage collection threshold at 2%, while the garbage collection thread count may be dynamically varied between 25 to 40 based on an increase or decrease of disk usage, as discussed herein with respect to 591, 592, 593. At 591, in an embodiment, if the disk usage increases within the predetermined time frame, the garbage collection thread count may be increased by 3, and may be limited to a maximum of 40. At 592, if the disk usage decreases with in the same predetermined time frame, the garbage collection thread count may decrease by 3, and may be limited to a minimum of 25. At 593, if the disk usage drops to 93%, e.g., below the low water yellow line—[Delta], the garbage collection thread count may be set to 10.

It is appreciated that the predetermined time frame may be the same or different at blocks 570, 580, 590.

At block 595 (Disk space usage>=High watermark red line), the processor for the adaptive garbage collection manager module 320 may be designed, programmed, or otherwise configured to determine the disk space usage, in which if the disk space usage is greater than or equal to the red line of the high watermark threshold, e.g., 95%, an alert operation is initiated, e.g., user or controller for the cloud based service is alerted of high disk space usage and/or an alert is generated at the PageStore layer, and write flow control may be initiated to manage the operation.

As such, the adaptive garbage collection manager module 320 may be designed programmed, or otherwise configured to optimize disk space utilization by making garbage collection decisions based on multiple real time factors, such as, disk capacity usage, capacity reported by PageStore LSM tree, or the like, such that the adaptive garbage collection manager module 320 may be configured to dynamically adjust garbage collection thresholds, bandwidth, and/or concurrency based on the capacity availability/usage, without affecting other tasks, such as, background compaction. Thus, the dynamic adjustments, as discussed herein, may help optimize the key-value engine performance based on the disk space utilization levels, for example, by improving the thread pool and CPU usage, e.g., for garbage collection.

The periodical compaction manager module 330 may be designed, programmed, or otherwise configured to address low garbage collection efficiency and delayed space release issues in the production environment caused by compaction, e.g., by assigning the priority of garbage collection and/or compaction process. For example, key-value engines may incorporate three types of background operations, including, but not limited to, flush, background garbage collection, and compactions. Flush may occur when the memTable is full or the write-ahead log (WAL) reaches its capacity, and the flush operation may be triggered for the key-value engine with a priority level of "high" for "flush operation," e.g., flush can preempt any low thread pools. Garbage collection may be triggered for the key-value engine when the garbage ratio, e.g., garbage data on the blob file versus total size of the blob file, of a specific blob file reaches a threshold value, such that a dedicated garbage collection thread may be used exclusively for the garbage collection operation. Compaction may include auto compaction and mark compaction, in which auto compaction may occur for adjusting the form of the LSM-tree for the key-value engine, e.g., to balance the LSM tree, whereas mark compaction may occur when there is no auto compaction, such that the SST for the key-value engine that have been marked will be selected for mark compaction, which may have a low priority.

An issue in compaction processes for prior key-value engines is the delayed pushdown of compaction which may lead to space expansion. The delayed pushdown of compaction may become more pronounced in key-value engines that utilize key-value separation techniques which may adversely affect the efficiency of garbage collection. Additionally, prior key-value engines lack the ability to identify space expansion caused by garbage data in cold SSTs at the lowest level.

In some embodiments, in order to overcome the deficiencies as discussed above, the periodical compaction manager module 330 may be provided that includes a periodical compaction scheduler module 332 and a periodical compaction executor module 334. In some embodiments, the periodical compaction manager module 330 may be designed, programmed, or otherwise configured to function at the column family (CF) level, e.g., in the PageStore, giving each column family the flexibility to enable or disable it based on individual requirements, e.g., design requirements, during the compaction operations.

Figure 6A:
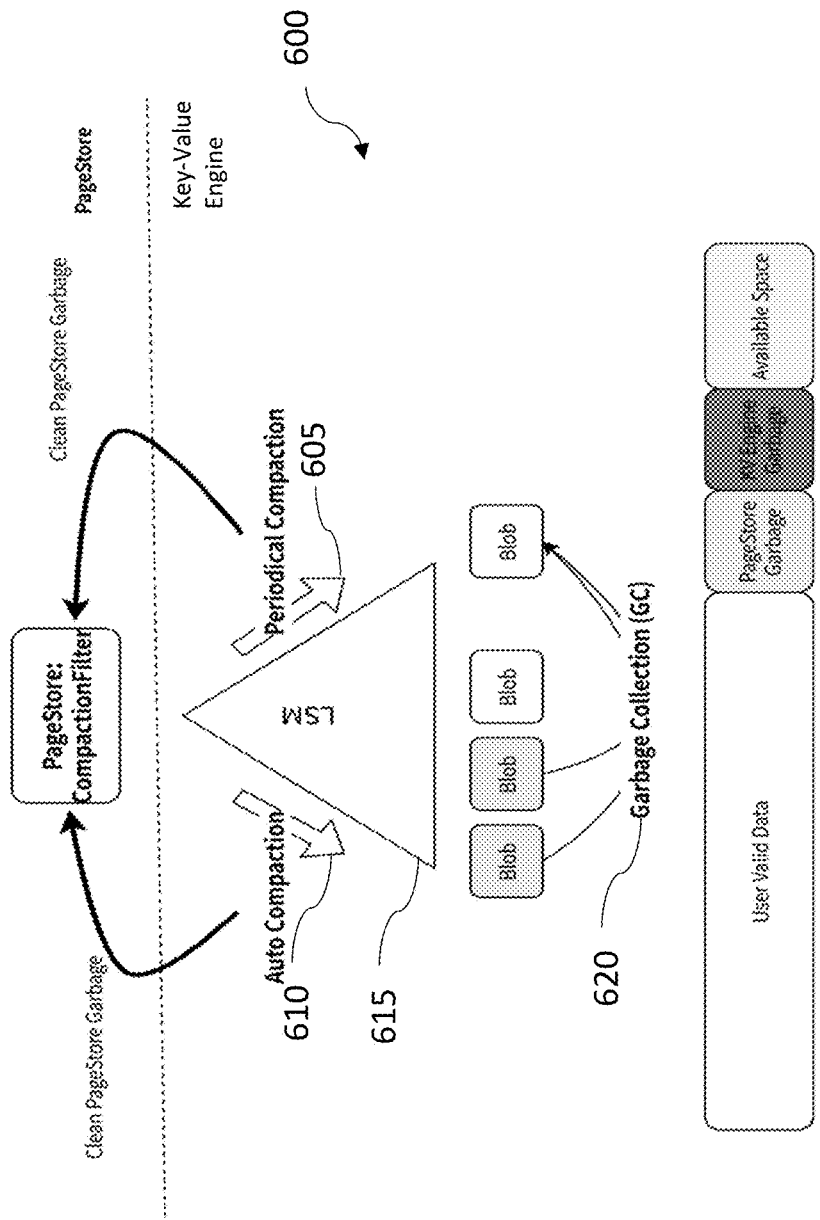
FIGS. 6A and 6B are schematic illustrations of example embodiments of a compaction operation by a periodical compaction manager, in accordance with at least some embodiments described herein.
Figure 6B:
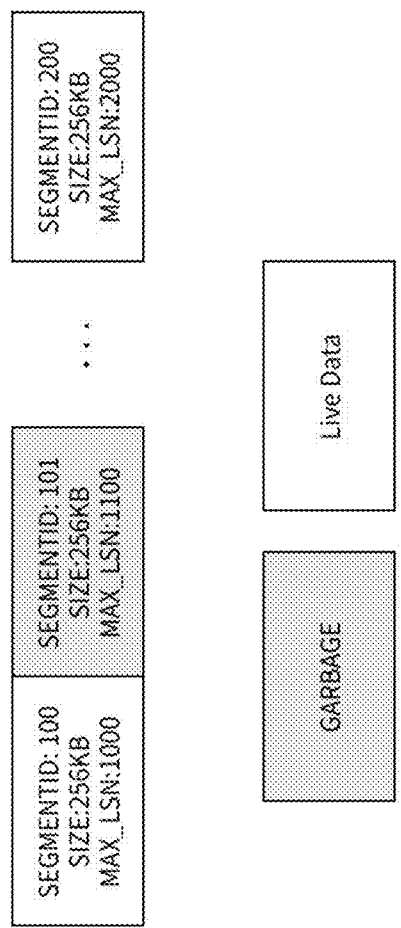

FIGS. 6A, 6B schematically illustrate an example embodiment of a compaction operation by the periodical compaction manager module 330, according to various embodiments. The periodical compaction manager module 330, as discussed herein, is provided to address the low garbage collection efficiency and delayed space release issues in the production environment caused by compaction by including a periodical compaction operation that is provided alongside the existing auto compaction process for the key-value engine. Thus, the periodical compaction manager module 330 is able to reduce unnecessary data movement during garbage collection for application data that has expired, but is not recognized by the key-value engine side pages, e.g., via communication with the PageStore to clean PageStore garbage, by consolidation one or more expired pages (of the same page(s)) of one or more applications by merging one or more layers into a last layer of the one or more expired pages to reduce data handling, e.g., in communication with the file system via an interface.

For example, in an embodiment, as schematically illustrated in FIG. 6A, a compaction operation 600 may include a periodical compaction operation 605, an auto compaction operation 610, and a garbage collection operation 620. The periodical compaction operation 605 may be initiated to scan the LSM-tree 615 and corresponding SST files from the top to the bottom of the LSM-tree. As the periodical compaction operation 605 is used to scan the LSM-tree from top to bottom, the periodical compaction manager module 330 is configured to identify SST files that may require compaction, e.g., SST files that include expired pages and/or blob files having a garbage ratio or rate above a predetermined threshold, e.g., ratio between valid user data, garbage data including PageStore garbage and key-value engine garbage, and/or available space. The auto compaction operation 610 may be automatically initiated to maintain the LSM-tree form and to handle garbage cleanup on the PageStore side. The auto compaction operation 610 may be triggered by external conditions, such as, external writes or marks. The garbage collection operation 620 may be initiated to clean up garbage data within the key-value engine, e.g., when a garbage ratio of blob files reaches a predetermined threshold. In some embodiments, after the periodical compaction operation 605, the auto compaction operation 610, and/or the garbage collection operation 620 has been performed, the periodical compaction manager module 330 may be further configured to periodically check the server load and/or clean the PageStore garbage data.

FIG. 6B illustrates an example embodiment of an operation to identify a SST file and corresponding blob file that may be marked for compaction, e.g., of one key-value engine applications. In an embodiment, the periodical compaction manager module 330 may be configured to determine the garbage ratio for the blob files based on the data in the SSTs for the LSM tree, e.g., garbage data versus live data. For example, in an embodiment, if the recyclable LSN (Log Sequence Number) of segment 101 exceeds 1100, such LSN indicates that all the data within segment 101 of that SST is considered garbage data. By comparing the segment IDs and aggregating the results, the precise size of the garbage data in the entire SST can be determined. It is noted that the term "size" as used herein may not refer to the size of the garbage data within the SST itself, but rather the size within the corresponding blob file to accurately reflect the total amount of garbage data. This design ensures that the entire database is scanned within the given time frame. An exemplary embodiment of the design requirement may include one or more of the following: user's actual capacity, e.g., greater than 70%; user's capacity (including LSM amplification), e.g., greater than 80%; disk utilization (LSM amplification and blob file garbage ratio), e.g., greater than 90%; frequency of scanning all SSTs, e.g., daily level; API to let upper layer determine whether compaction is needed; minimize overhead to avoid I/O spikes; and support real-time identification of upper-layer garbage data in scenarios with continuous data writing.

It is understood that the triggering mechanism for periodical compaction may be different from auto compaction and garbage collection. For example, while auto compaction and garbage collection may rely on external conditions, such as, external writes or marks, periodical compaction requires support for internal proactive scanning to discover expired SST files and initiate periodical compaction (e.g., time-based incremental scanning). As such, the periodical compaction manager module 330 may include the periodical compaction scheduler module 332 which may be designed, programmed, or otherwise configured to collaborate with business logic to comprehend space amplification and aims to minimize scheduling overhead, e.g., to coordinate the timing of periodical compaction based on the workload characteristics and priority of the operation. In some embodiments, the periodical compaction scheduler module 332 may be designed, programmed, or otherwise configured to be implemented as a scheduled task. For example, in embodiments in which column families have enabled periodical compaction, the LSM-tree SST files may be scanned from top to bottom. As suitable SST files are found, e.g., for compaction, the column family may be added to the pending compaction queue. As such, the periodical compaction scheduler module 332 may be configured to schedule periodical compaction independently of external events by proactively scanning the LSM-tree to identify eligible SST files, ensuring efficient management of the storage space.

Figure 7:
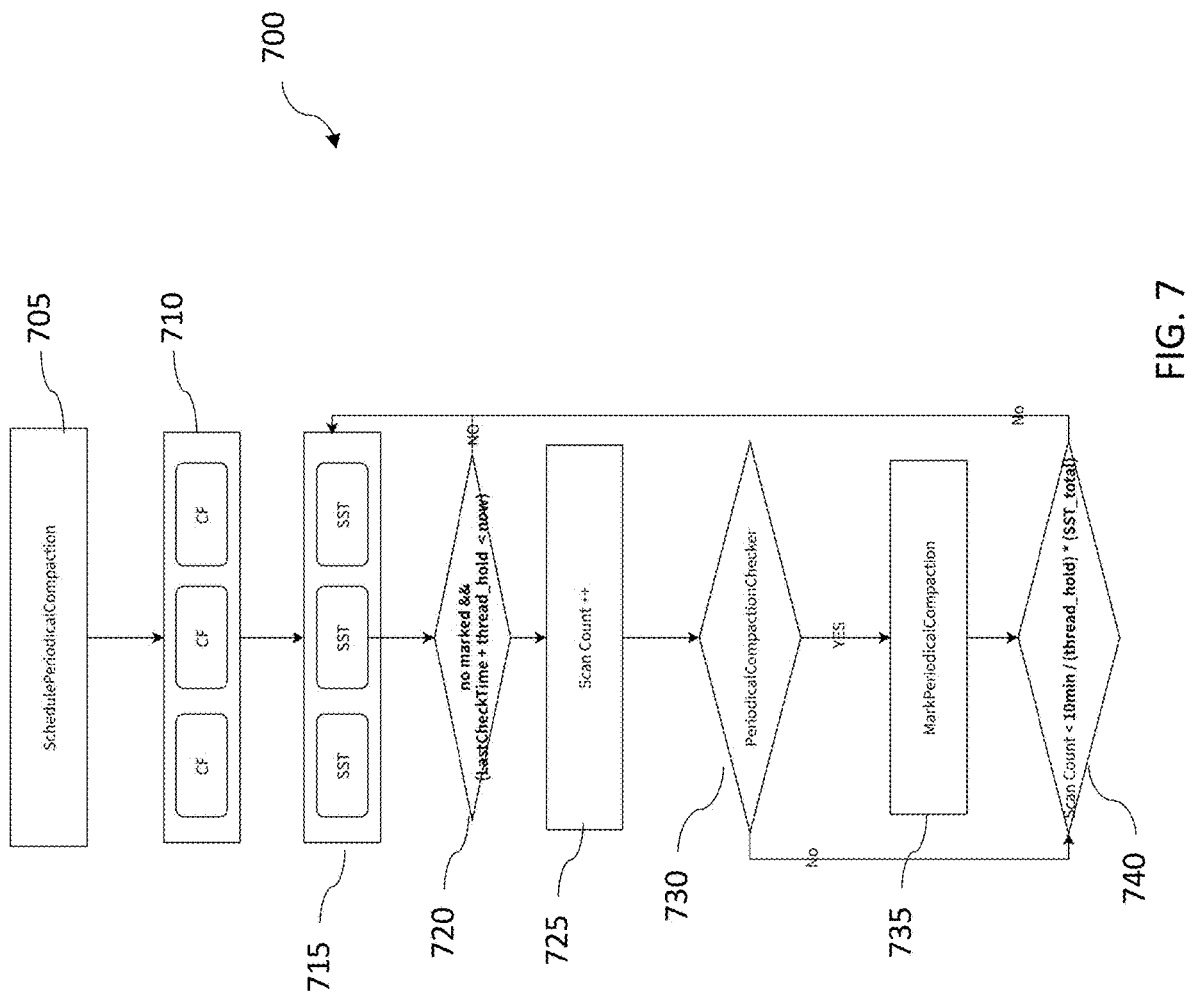
FIG. 7 is an example embodiment of a process flow for scheduling periodical compaction, in accordance with at least some embodiments described herein.

FIG. 7 is an illustrative example operation of a process flow 700 for scheduling periodical compaction by the periodical compaction scheduler module 332, according to an embodiment.

It is to be understood that the processing flow 700 or operation can include one or more operations, actions, or functions as illustrated by one or more of blocks 705, 710, 715, 720, 725, 730, 735, and 740. These various operations, functions, or actions may, for example, correspond to software, firmware, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow, operations including initializations or the like may be performed.

Processing flow 700 may begin at block 705. The processor of the periodical compaction scheduler module 332 of the key-value engine may be designed, programmed, or otherwise configured to initiate a proactive scanning of the LSM tree to identify any eligible SST files for compaction, as discussed herein. The process flow 700 may proceed to block 710.

At 710, the periodical compaction scheduler module 332 may be configured to proactively scan the LSM tree from top to bottom to identify any column families having any expired SST files. The process flow may proceed to block 715.

At 715, the periodical compaction scheduler module 332 may be configured to proactively scan the SSTs files for each of the column families to determine whether any SST files in the column family include expired data and/or garbage data needing compaction. The process flow may proceed to block 720.

At 720, the periodical compaction scheduler module 332 may be configured to determine whether any SST files have been marked for compaction and create a thread hold for the marked SST files. If no SST files have been marked for compaction and the last check time, e.g., actual creation time of the file, and thread hold is greater than a certain time, e.g., "now," the process flow may return to block 715 for re-scanning of the SST files for files that may need compaction. If the SST files have been marked for compaction and the last check time and thread hold is less than the time "now," then the process flow may proceed to block 725.

At 725, the periodical compaction scheduler module 332 may be configured to scan count the SST files marked for compaction. The process flow may proceed to block 730.

At 730, the periodical compaction scheduler module 332 may be configured to determine whether a threshold for autocompaction or mark compaction has been triggered. If it is determined at the periodical compaction checker that periodical compaction should be triggered, e.g., via mark periodical compaction, then the periodical compaction is scheduled to be executed, e.g., by the periodical compaction executor module 334. If the periodical compaction checker is not scheduled for execution, at 730, the process flow may proceed to 740.

At 740, the periodical compaction scheduler module 332 may be configured to determine whether autocompaction should be initiated or executed. In an embodiment, if the scan count is less than 10 minutes/(thread_hold)*(SST_total), then the autocompaction process may be initiated. If the scan count is not less than 10 minutes/(thread_hold)*(SST_total), then the process may return to block 715 for re-scanning of the SST files.

The periodical compaction executor module 334 may be designed, programmed, or otherwise configured to extend the functionality of the MarkCompaction module by being further configured to accommodate the periodical compaction operations. As such, the periodical compaction executor module 334 is configured to check for the SST files that have been marked for compaction, and perform a compaction operation on the same, e.g., merging multiple layers of data by removing duplicated entries and old expired data.

In an embodiment, the periodical compaction executor module 334 may be configured to sequentially check each layer from the top down to identify any expired SSTs that meet the criteria, since the higher the layer, the higher the priority should be, e.g., aligns better with the process of pushing files down from the top. The periodical compaction executor module 334 may be implemented along with the periodical compaction scheduler module 332, e.g., at block 730, to implement the idea of time-based incremental scanning. In an embodiment, at the Periodical Compaction Checker block 730, properties of the LastCheckTime may be examined as follows: For the last layer of files, the actual creation time is used as LastCheckTime. However, for files in other layers, the LastCheckTime is determined based on the file range, in which an intersection between the file's range and the input file's range is determined, and then the oldest creation time is calculated. Based on the LastCheckTime, the files may be compacted, e.g., if old or expired pages.

It is appreciated that in some embodiments, two types of files may be considered during the execution of periodic compaction: (i) upper-layer files Li (i=0~N-1), and (ii) the bottom-layer file LN. As such, when pushing down files from the upper-layer Li files, adjacent LSNs can be merged to streamline the compaction process. For the bottom-layer LN files, an active compaction approach may be adopted to detect expired pages, e.g., mvpage using the CompactionFilter.

Moreover, in some embodiments, a time to live (TTL) parameter may be used to specify the maximum amount of time a piece of data should be retained or considered valid. When a TTL is set for a specific piece of data, the key-value store may be configured to automatically remove or invalidate that data after the specified time period has elapsed to help to manage data expiration and ensure that outdated or unnecessary data is automatically removed from the system, freeing up storage space and improving system performance. In some embodiments, factors to consider for configuring TTL may include, but not limited to, compaction bandwidth monitoring and overhead evaluation including overall bandwidth of pushdown TTL compaction and overall bandwidth of lower-end TTL compaction; and compaction effect monitoring and benefit evaluation including overall data deletion amount of pushdown TTL compaction and overall data deletion amount of lower-end TTL compaction.

In view of the above, the periodical compaction manager module 330 may be provided to overcome the deficiencies of prior key-value engine designs, e.g., by alleviating the inefficiencies associated with garbage collection and address space-related challenges by providing a more adaptive and flexible compaction solution at the column family level, which may be communicated with the file system to reduce unwanted/unnecessary data movement.

The garbage collection read amplification optimizer module 340 may be designed programmed, or otherwise configured to reduce read amplification brought by through the garbage collection process itself. Read amplification may be more pronounced in scenarios involving key-value engines that use the key-value separation technique and may adversely affects the efficiency of garbage collection.

It is understood that the garbage collection process may be divided into three specific steps: (i) Reading the keys from the blob files on disk (read phase), (ii) Checking the validity of each key (validity check phase), and (iii) Writing the still valid key-value pairs to a new file (write phase). However, a significant efficiency issue may be experienced with the prior garbage collection mechanisms in which the system may be characterized by high garbage ratios and low capacity thresholds for heavily written data. Since the prior garbage collection mechanisms are triggered when both of these conditions are met, e.g., when the garbage ratio is extremely high and the proportion of valid data is low, the prior garbage collection mechanisms suffer from severe read amplification and hampers overall garbage collection efficiency. For example, since the entire SST needs to be scanned during garbage collection, to examine the validity of all keys, the prior garbage collection mechanisms may be inefficient.

As such, the garbage collection read amplification optimizer module 340 may be designed, programmed, or otherwise configured to store a redundant set of keys at the end of the SST. Thus, during garbage collection, only the key set at the end of the SST needs to be read. For invalid keys, the corresponding values may be skipped, while for valid keys, the respective values may be retrieved. By the garbage collection read amplification optimizer module 340 being configured to store the key set at the end of the SST, the read amplification may be minimized by enabling the retrieval of only valid key values. In some embodiments, the BlockBasedTable format for the SST may be used, which may ensure that each key-value pair occupies a dedicated data block, and the key information stored in the index block is a complete representation of the keys in the data block. As a result, the index block contains comprehensive key information for the SST.

The hot/cold data separator module 350 may be designed, programmed, or otherwise configured to reduce write amplification that results from mixed data, e.g., hot and cold data. It is understood that one of the primary issues with mixed hot and cold data is that when hot data becomes invalid, rewriting cold data becomes necessary to reclaim space, resulting in additional write amplification. As such, the hot/cold data separator module 350 may be configured to automatically identify the hotness and coldness of values and ensure that during Flush/Compaction/garbage collection/key-value separation, values with different hotness levels are moved to different blob files to reduce garbage collection migration write amplification. In order to address such tasks, the hot/cold data separator module 350 may include a hot and cold data identifier module 351, a flush optimizer module 352, a compaction optimizer module 353, an optimization strategies module 354, and a compression optimizer module 355.

The hot and cold data identifier module 351 may be designed, programmed, or otherwise configured to identify hot and cold data. In some embodiments, since PageStore does not have overwrite functionality, but provides external read and write operations for pages, in which multiple versions of each page may be stored with the key organized as PageID+LSN (Log Sequence Number), the fundamental granularity for identifying hot and cold pages may be defined as PageID. In some embodiments, hot pages may include repeated writes to the same PageID, resulting in incremental LSN values. When LSN advances, during Key SST Compaction, the Compaction Filter may compare the hot pages with (e.g., *LSN) to determine if the data has become invalid. When certain PageIDs have much higher write frequencies than others, these pages may be considered as hot pages.

In some embodiments, an Application Programming Interface (API) may be provided to provide application-level awareness of data hotness and coldness by introducing an interface similar to CompactionFilter. As such, the hot/cold data separator module 350 may be designed, programmed, or otherwise configured to enable hot and cold separation, e.g., for rewriting in or moving of data to different blob files. In other embodiments, the key-value engine may be designed, programmed, or otherwise configured to collect PageID information based on flush and compaction contexts, using frequency to differentiate between hot and cold data.

The flush optimizer module 352 may be designed, programmed, or otherwise configured to, during flush time, identify pages that appear multiple times in the memTable, and consider the pages that exceed a certain threshold K as hot pages, while pages with relatively fewer occurrences may be identified as cold pages. While the hotness classification has been discussed herein at hot and cold data, such disclosure is not intended to be limiting. Rather, the hotness classification may be expanded beyond just hot and cold data. For example, during flush, supporting multiple streams of output could allow for finer granularity, categorizing pages as hot, warm, cold, and the like.

The compaction optimizer module 353 may be designed, programmed, or otherwise configured to optimize compaction, for example, by utilizing information from both upper and lower layers by implementing periodic KeySST compaction. Moreover, the compaction optimizer module 353 may be designed, programmed, or otherwise configured to avoid overwrites to prevent delayed delete propagation.

The optimization strategies module 354 may be designed, programmed, or otherwise configured to optimize the garbage collection pick strategy. It is appreciated that since the hot and cold blob files may be differentiated during the flush phase, and the hot blob files may have higher garbage rates, a correlation between garbage rates and blob file types may be established. Moreover, blob files with garbage rates reaching the garbage collection threshold, the blob files of the same category may be merged. This is because achieving the same garbage rate may require a shorter waiting time for hot blob files, while cold blob files may take longer. Additionally, the average lifespan of cold blob files is expected to be significantly longer than that of hot blob files.

In some embodiments, cold pages may be identified within a hot blob file by identifying pages that undergo multiple copy operation during the garbage collection, since such pages are likely to become cold, e.g., utilize statistical information from the flush window, e.g., reverse lookup on the flush window is performed. In some embodiments, cold-to-hot conversion may be performed by having the hot key-value pairs removed, so there is no need to perform a reverse lookup on the flush window.

The compression optimizer module 355 may be designed, programmed, or otherwise configured to apply compression algorithms on warm or cold data on the upper layer and leaving hot data untouched in the key-value engine. That is, since hot data has a relatively short lifespan and a smaller working volume, heavy compression algorithms are not needed for the hot data. However, for warm and cold data, the warm and cold data may benefit from compression to reduce storage space usage.

In some embodiments, e.g., small Write Load Scenario, in which it may be challenging to differentiate between hot and cold data, all data may be perceived as hot due to its frequent usage and short lifespan, and no compression algorithm will be applied to the data pages. This may help to maintain efficient handling of the data with minimal overhead.

In some embodiments, e.g., Large Write Zipf Load Scenario, in which a large amount of data is being written, and there is a Zipf distribution indicating some data is accessed more frequently than others, such data may be identified as the hot data. This hot data is then exempted from compression to preserve its accessibility and reduce computational overhead. Moreover, separating the storage of hot and cold data helps in minimizing garbage collection write amplification, leading to better overall system performance.

Figure 8:
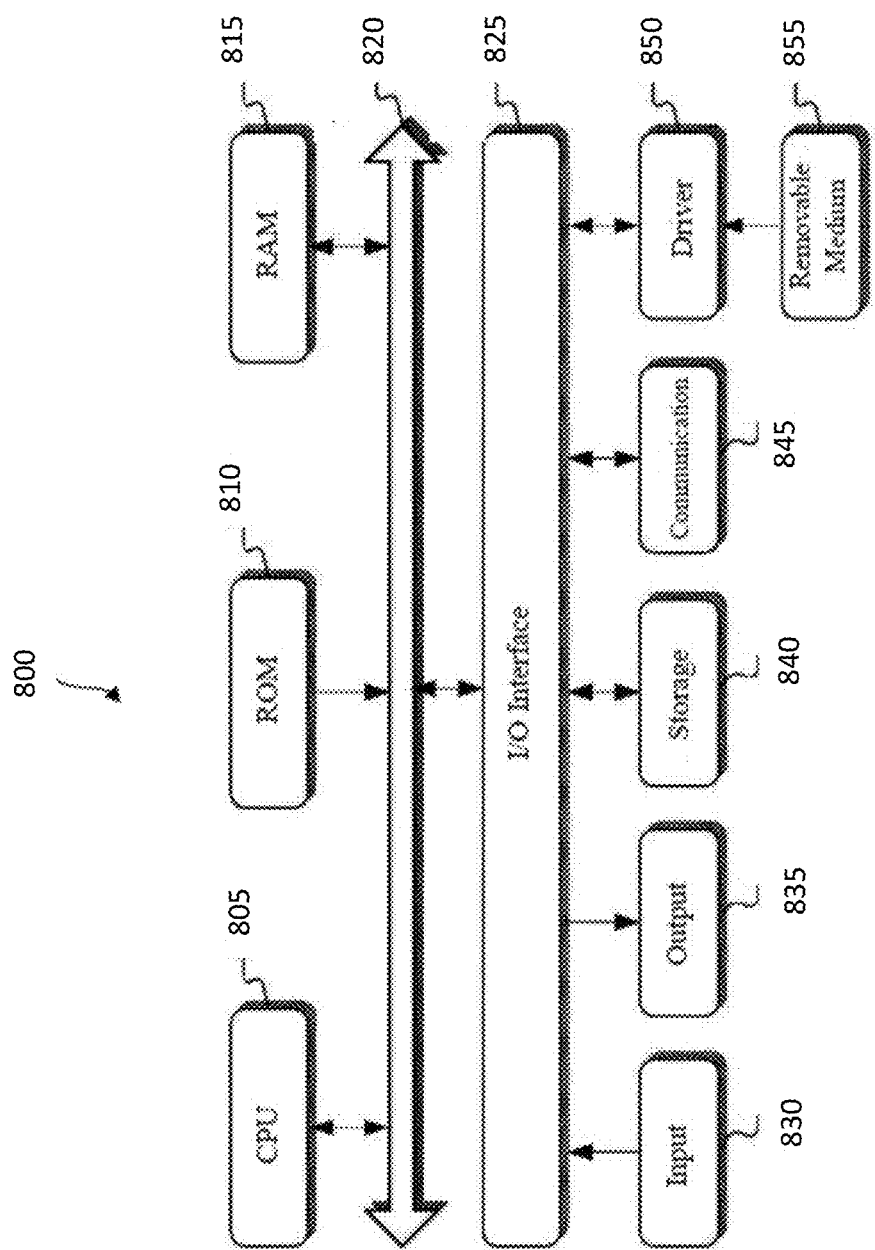
FIG. 8 is a schematic structural diagram of an example computer system applicable to implementing a device, arranged in accordance with at least some embodiments described herein.

FIG. 8 is a schematic structural diagram of an example computer system 800 applicable to implementing an electronic device (for example, the server, host device, or one of the terminal devices shown in FIG. 1), arranged in accordance with at least some embodiments described herein. It is to be understood that the computer system shown in FIG. 8 is provided for illustration only instead of limiting the functions and applications of the embodiments described herein.

As depicted, the computer system 800 may include a central processing unit (CPU) 805. The CPU 805 may perform various operations and processing based on programs stored in a read-only memory (ROM) 810 or programs loaded from a storage device 840 to a random-access memory (RAM) 815. The RAM 815 may also store various data and programs required for operations of the system 800. The CPU 805, the ROM 810, and the RAM 815 may be connected to each other via a bus 820. An input/output (I/O) interface 825 may also be connected to the bus 820.

The components connected to the I/O interface 825 may further include an input device 830 including a keyboard, a mouse, a digital pen, a drawing pad, or the like; an output device 835 including a display such as a liquid crystal display (LCD), a speaker, or the like; a storage device 840 including a hard disk or the like; and a communication device 845 including a network interface card such as a LAN card, a modem, or the like. The communication device 845 may perform communication processing via a network such as the Internet, a WAN, a LAN, a LIN, a cloud, etc. In an embodiment, a driver 850 may also be connected to the I/O interface 825. A removable medium 855 such as a magnetic disk, an optical disk, a magneto-optical disk, a semiconductor memory, or the like may be mounted on the driver 850 as desired, such that a computer program read from the removable medium 855 may be installed in the storage device 840.

It is to be understood that the processes described with reference to the flowcharts of FIGS. 5A-7 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 845, and/or may be installed from the removable medium 855. The computer program, when being executed by the central processing unit (CPU) 805, can implement the above functions specified in the method in the embodiments disclosed herein.

Thus, the methods and systems as discussed herein, may have one or more of the following advantages:

Accurate garbage collection management—In some embodiments, the key-value engine may be designed, programmed, or otherwise configured to consider the garbage rates at an entry level instead of at a space level, e.g., to select blog files with the highest garbage ratio/percentage, to address the issue of precise garbage collection scheduling. By having the key-value engine designed, programmed, or otherwise configured to consider garbage rates at the entry level, the blob file(s) may be selected with the highest garbage space for garbage collection to result in more efficient garbage collection operations. Additionally, the key-value engine may be enhanced by having garbage collection awareness, e.g., by being aware of application-side data deletion, including expired pages, that is in communication with the file system, e.g., via kernel file interface, application programming interface, or the like, to reduce unnecessary data movement. Moreover, periodical compaction processes may be used to clean up expired pages and further reduce unnecessary data movement during a garbage collection process.

Adaptive garbage collection—In some embodiments, the key-value engine may be designed, programmed, or otherwise configured such that the garbage collection process is flexible, diverse, concurrent, and has awareness of a physical capacity of the storage. For example, in some embodiments, the key-value engine may be designed, programmed, or otherwise configured to consider a wider range of garbage collection strategies, e.g., to improve concurrency when in high water levels or regions, and optimize space reclamation. As such, the overall garbage collection performance for the key-value engine may be significantly enhanced over prior key-value engines having garbage collection strategies that result in premature garbage collection which may to lead to additional write amplification problems, insufficient concurrency during high-water levels, and/or slow space reclamation.

Periodical compaction management—In some embodiments, the key-value engine may be designed, programmed, or otherwise configured to provide periodic compaction functionality, e.g., for cleaning up expired pages. In some embodiments, the periodical compaction may include merging multiple layers of the same page (or expired pages) in a log-structured merge (LSM) tree into the last layer, such that the upper layers can perform corresponding functions during the compaction process. By doing so, the amount of data subject to the garbage collection process may be reduced. Moreover, the key-value engine may be designed, programmed, or otherwise configured to prioritize the operation of the garbage collection and/or compaction, e.g., higher priority processes will be initiated before lower priority processes.

Garbage collection read amplification optimization—In some embodiments, the key-value engine may be designed, programmed, or otherwise configured such that the read amplification that occurs during garbage collection itself is reduced. For example, in some embodiments, a redundant set of keys may be stored at the end of a sorted string table (SST).

Optimization of hot and cold data—In some embodiments, the key-value engine may be designed, programmed, or otherwise configured to identify and segregate hot and cold data to reduce write amplification, especially for mixed data scenarios, in which when hot data becomes invalid, rewriting cold data becomes necessary to reclaim space, which results in additional WAF.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

It is appreciated that any one of aspects can be combined with each other.

Aspect 1. A method of garbage collection for a key-value engine in a data storage and communication system, the method comprising: determining disk capacity usage of the key-value engine; adjusting a garbage collection percentage threshold and a number of garbage collection threads based on whether the disk capacity usage of the key-value engine meets and/or exceeds predetermined disk capacity usage thresholds.

Aspect 2. The method of Aspect 1, further comprising: performing a periodic compaction process to consolidate one or more expired pages of one or more applications on a log-structured merge (LSM) tree by merging one or more layers into a last layer of the one or more expired pages to reduce data handling during an occurrence of the garbage collection.

Aspect 3. The method of Aspect 2, wherein the performing the periodic compaction process occurs along with an auto compaction process.

Aspect 4. The method of any of Aspects 2-3, wherein the performing the periodic compaction process comprises coordinating a timing of the performing of the periodic compaction process and reclaiming memory during the performing of the periodic compaction process.

Aspect 5. The method of any of Aspects 1-4, further comprising: determining a garbage volume for one or more blob files in the key-value engine, wherein the determining the garbage volume includes: storing a value size of the one or more blob files in a delta block in a sorted string table (SST) of the key-value engine; summing sizes of all SST entries that are dependent on the one or more blob files to determine an effective data size of the one or more blob files; determining any remaining size of the one or more blob files as the garbage volume; and executing an occurrence of a garbage collection process on selected blob files.

Aspect 6. The method of Aspect 5, further comprising: storing a redundant set of keys for the one or more blob files at an end of the SST, wherein during garbage compaction, only the redundant set of keys are read.

Aspect 7. The method of any of Aspects 5-6, further comprising: determining hotness and/or coldness of the one or more blob files, wherein the determining of the hotness and/or the coldness includes one or more of the following: using an application programming interface having application-level awareness to identifying the hotness and/or coldness of the one or more blob files; using frequency of page writes to differentiate between the hotness and/or coldness of the one or more blob files; or identifying pages that appear multiple times in a memTable, wherein the hotness and/or the coldness of the one or more blob files is based on a threshold value.

Aspect 8. The method of any of Aspects 1-7, wherein the adjusting of the garbage collection percentage threshold and the number of garbage collection threads comprise one or more of: wherein when disk space utilization is below a first predetermined threshold, the number of garbage collection threads is set to a first thread value and the garbage collection (GC) percentage threshold is dynamically set between a first GC percentage threshold and a second GC percentage threshold based on disk usage; wherein when the disk space utilization is between a second predetermined threshold and a third predetermined threshold, the number of garbage collection threads and the garbage collection percentage threshold are dynamically adjusted, wherein the dynamically adjustment includes increasing or decreasing the number of garbage collection threads and/or the garbage collection percentage threshold based on the disk space utilization and/or whether the disk usage increases or decreases.

Aspect 9. A proactive garbage collection system for a key-value engine, the proactive garbage collection system comprising: an adaptive garbage collection module for implementing a flexible and adaptive garbage collection strategy, wherein the adaptive garbage collection module is configured to determine disk capacity usage of the key-value engine, and adjust a garbage collection percentage threshold and a number of garbage collection threads based on whether the disk capacity usage of the key-value engine meets and/or exceeds predetermined disk capacity usage thresholds.

Aspect 10. The proactive garbage collection system of Aspect 9, further comprising a periodical compaction module for implementing periodic compaction to optimize garbage collection efficiency and space reclamation.

Aspect 11. The proactive garbage collection system of any of Aspects 9-10, further comprising one or more of: an accurate garbage collection module for providing precise information for garbage collection; a garbage collection read amplification optimizer module for reducing read amplification during garbage collection; or a hot cold data separator module for facilitating identification and separation of hot and cold data to minimize write amplification.

Aspect 12. The proactive garbage collection system of Aspect 10, wherein the periodical compaction module comprises a periodical compaction scheduler module for scheduling periodic compaction operations, and a periodical compaction executor for executing scheduled compaction operations.

Aspect 13. The proactive garbage collection system of any of Aspects 11-12, wherein the hot cold data separator module comprises one or more of the following: a hot and cold data identifier module for classifying data as hot data or cold data based on usage patterns; a flush optimizer module for optimizing data flushing based on the data being hot data or cold data to reduce write amplification; a compaction optimizer module for optimizing compaction processes based on the hot data or cold data for improved space reclamation; an optimization strategy for garbage collection module for providing diversified strategies for garbage collection based on the hot data or the cold data; and a compression optimizer module for optimizing data compression techniques based on the hot data or the cold data to reduce storage overhead.

Aspect 14. The proactive garbage collection system of any of Aspects 9-13, wherein the adaptive garbage collection module is configured to determine disk capacity usage of the key-value engine, and adjust a garbage collection percentage threshold and a number of garbage collection threads based on predetermined disk capacity usage thresholds.

Aspect 15. The proactive garbage collection system of Aspect 14, wherein the garbage collection percentage threshold and the number of garbage collection threads comprise one or more of: wherein when disk space utilization is below a first predetermined threshold, the number of garbage collection threads is set to a first thread value and the garbage collection percentage threshold is dynamically set between a first GC percentage threshold and a second GC percentage threshold based on disk usage; wherein when the disk space utilization is between a second predetermined threshold and a third predetermined threshold, the number of garbage collection threads and the garbage collection percentage threshold are dynamically adjusted, wherein the dynamically adjustment includes increasing or decreasing the number of garbage collection threads and/or the garbage collection percentage threshold based on the disk space utilization and/or whether the disk usage increases or decreases.

Aspect 16. A non-volatile storage having stored thereon executable components, which when executed by a processor, cause the processor to: determine disk capacity usage of a key-value engine; adjust a garbage collection percentage threshold and a number of garbage collection threads based on whether the disk capacity usage of the key-value engine meets and/or exceeds predetermined disk capacity usage thresholds.

Aspect 17. The non-volatile storage of Aspect 16, wherein the processor is further configured to perform a periodic compaction process to consolidate one or more expired pages of one or more applications on a log-structured merge (LSM) tree by merging one or more layers into a last layer of the one or more expired pages to reduce data handling during garbage collection Aspect 18. The non-volatile storage of Aspect 17, wherein the performing the periodic compaction process comprises coordinating a timing of the performing of the periodic compaction process and reclaiming memory during the performing of the periodic compaction process.

Aspect 19. The non-volatile storage of any of Aspects 16-18, wherein the processor is further configured to: determine a garbage volume for one or more blob files in the key-value engine, wherein the determining the garbage volume includes: storing a value size of the one or more blob files in a delta block in a sorted string table (SST) of the key-value engine; summing sizes of all SST entries that are dependent on the one or more blob files to determine an effective data size of the one or more blob files; determining any remaining size of the one or more blob files as the garbage volume; and executing an occurrence of a garbage collection process on selected blob files.

Aspect 20. The non-volatile storage of Aspect 19, wherein the processor is further configured to: determine hotness and/or coldness of the one or more blob files, wherein the determining of the hotness and/or the coldness includes one or more of the following: using an application programming interface having application-level awareness to identifying the hotness and/or coldness of the one or more blob files; using frequency of page writes to differentiate between the hotness and/or coldness of the one or more blob files; or identifying pages that appear multiple times in a memTable, wherein the hotness and/or the coldness of the one or more blob files is based on a threshold value.

Aspect 21. The non-volatile storage of any of Aspects 18-20, where the processor is further configured to: store a redundant set of keys for the one or more blob files at an end of the SST, wherein during garbage compaction, only the redundant set of keys are read.

Aspect 22. The non-volatile storage of any of Aspects 16-21, wherein the adjusting of the garbage collection percentage threshold and the number of garbage collection threads comprise one or more of: wherein when disk space utilization is below a first predetermined threshold, the number of garbage collection threads is set to a first thread value and the garbage collection percentage threshold is dynamically set between a first GC percentage threshold and a second GC percentage threshold based on disk usage; wherein when the disk space utilization is between a second predetermined threshold and a third predetermined threshold, the number of garbage collection threads and the garbage collection percentage threshold are dynamically adjusted, wherein the dynamically adjustment includes increasing or decreasing the number of garbage collection threads and/or the garbage collection percentage threshold based on the disk space utilization and/or whether the disk usage increases or decreases.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method of garbage collection for a key-value engine in a data storage and communication system, the method comprising:
   determining disk capacity usage of the key-value engine;
   adjusting a garbage collection percentage threshold and a number of garbage collection threads based on whether the disk capacity usage of the key-value engine meets and/or exceeds predetermined disk capacity usage thresholds; and
   determining a garbage volume for one or more blob files in the key-value engine,
   wherein the determining the garbage volume includes:
   storing a value size of the one or more blob files in a delta block in a sorted string table (SST) of the key-value engine;
   summing sizes of all SST entries that are dependent on the one or more blob files to determine an effective data size of the one or more blob files; and
   determining any remaining size of the one or more blob files as the garbage volume; and executing an occurrence of a garbage collection process on selected blob files.

2. The method of claim 1, further comprising:
   performing a periodic compaction process to consolidate one or more expired pages of one or more applications on a log-structured merge (LSM) tree by merging one or more layers into a last layer of the one or more expired pages to reduce data handling during an occurrence of the garbage collection.

3. The method of claim 2, wherein the performing the periodic compaction process occurs along with an auto compaction process.

4. The method of claim 2, wherein the performing the periodic compaction process comprises coordinating a timing of the performing of the periodic compaction process and reclaiming memory during the performing of the periodic compaction process.

5. The method of claim 1, further comprising:
   storing a redundant set of keys for the one or more blob files at an end of the SST, wherein during garbage compaction, only the redundant set of keys are read.

6. The method of claim 1, further comprising:
   determining hotness and/or coldness of the one or more blob files,
   wherein the determining of the hotness and/or the coldness includes one or more of the following:
   using an application programming interface having application-level awareness to identify the hotness and/or coldness of the one or more blob files;
   using frequency of page writes to differentiate between the hotness and/or coldness of the one or more blob files; or
   identifying pages that appear multiple times in a memTable, wherein the hotness and/or the coldness of the one or more blob files is based on a threshold value.

7. The method of claim 1, wherein the adjusting of the garbage collection percentage threshold and the number of garbage collection threads comprises one or more of:
   wherein when disk space utilization is below a first predetermined threshold, the number of garbage collection threads is set to a first thread value and the garbage collection (GC) percentage threshold is dynamically set between a first GC percentage threshold and a second GC percentage threshold based on disk usage; or
   wherein when the disk space utilization is between a second predetermined threshold and a third predetermined threshold, the number of garbage collection threads and the garbage collection percentage threshold are dynamically adjusted, wherein dynamic adjustment includes increasing or decreasing the number of garbage collection threads and/or the garbage collection percentage threshold based on the disk space utilization and/or whether the disk usage increases or decreases.

8. A proactive garbage collection system for a key-value engine, the proactive garbage collection system comprising:
   one or more processors; and
   a storage device storing one or more programs, when being executed by the one or more processors, cause the one or more processors to perform operations comprising:
   determining disk capacity usage of the key-value engine; and
   adjusting a garbage collection percentage threshold and a number of garbage collection threads based on whether the disk capacity usage of the key-value engine meets and/or exceeds predetermined disk capacity usage thresholds; and
   determining a garbage volume for one or more blob files in the key-value engine,
   wherein the determining the garbage volume comprises:
   storing a value size of the one or more blob files in a delta block in a sorted string table (SST) of the key-value engine;
   summing sizes of all SST entries that are dependent on the one or more blob files to determine an effective data size of the one or more blob files; and
   determining any remaining size of the one or more blob files as the garbage volume; and
   executing an occurrence of a garbage collection process on selected blob files.

9. The proactive garbage collection system of claim 8, wherein the operations further comprise implementing periodic compaction to optimize garbage collection efficiency and space reclamation.

10. The proactive garbage collection system of claim 8, wherein the operations comprise:
    reducing read amplification during garbage collection; or
    facilitating identification and separation of hot and cold data to minimize write amplification.

11. The proactive garbage collection system of claim 9, wherein the implementing periodic compaction comprises:
    scheduling periodic compaction operations; and
    executing scheduled compaction operations.

12. The proactive garbage collection system of claim 8, wherein the garbage collection percentage threshold and the number of garbage collection threads comprise one or more of:

wherein when disk space utilization is below a first predetermined threshold, the number of garbage collection threads is set to a first thread value and the garbage collection percentage threshold is dynamically set between a first GC percentage threshold and a second GC percentage threshold based on disk usage; or wherein when the disk space utilization is between a second predetermined threshold and a third predetermined threshold, the number of garbage collection threads and the garbage collection percentage threshold are dynamically adjusted, wherein dynamic adjustment includes increasing or decreasing the number of garbage collection threads and/or the garbage collection percentage threshold based on the disk space utilization and/or whether the disk usage increases or decreases.

13. A non-volatile storage having stored thereon executable components, which when executed by one or more processors, cause the one or more processors to:
  determine disk capacity usage of a key-value engine;
  adjust a garbage collection percentage threshold and a number of garbage collection threads based on whether the disk capacity usage of the key-value engine meets and/or exceeds predetermined disk capacity usage thresholds, and
  determine a garbage volume for one or more blob files in the key-value engine by operations comprising:
    storing a value size of the one or more blob files in a delta block in a sorted string table (SST) of the key-value engine;
    summing sizes of all SST entries that are dependent on the one or more blob files to determine an effective data size of the one or more blob files; and
    determining any remaining size of the one or more blob files as the garbage volume; and executing an occurrence of a garbage collection process on selected blob files.

14. The non-volatile storage of claim 13, wherein the one or more processors are further configured to perform a periodic compaction process to consolidate one or more expired pages of one or more applications on a log-structured merge (LSM) tree by merging one or more layers into a last layer of the one or more expired pages to reduce data handling during garbage collection.

15. The non-volatile storage of claim 14, wherein the periodic compaction process comprises coordinating a timing of the periodic compaction process and reclaiming memory during the periodic compaction process.

16. The non-volatile storage of claim 13, wherein the one or more processors are further configured to:
  determine hotness and/or coldness of the one or more blob files,
  wherein the hotness and/or the coldness are determined by one or more of the following:
  using an application programming interface having application-level awareness to identifying the hotness and/or coldness of the one or more blob files;
  using frequency of page writes to differentiate between the hotness and/or coldness of the one or more blob files; or
  identifying pages that appear multiple times in a memTable, wherein the hotness and/or the coldness of the one or more blob files is based on a threshold value.

17. The non-volatile storage of claim 13, where the one or more processors are further configured to:
  store a redundant set of keys for the one or more blob files at an end of the SST, wherein during garbage compaction, only the redundant set of keys are read.

* * * * *